US010456719B2

(12) United States Patent
Baumann et al.

(10) Patent No.: US 10,456,719 B2
(45) Date of Patent: Oct. 29, 2019

(54) FLUID FILTER WITH REPLACEABLE FILTER INSERT

(71) Applicant: Hengst SE & Co. KG, Muenster (DE)

(72) Inventors: Dieter Baumann, Greven (DE); Wilhelm Ardes, Ascheberg (DE)

(73) Assignee: Hengst SE & Co. KG, Muenster (DE)

( * ) Notice: Subject to any disclaimer, the term of this patent is extended or adjusted under 35 U.S.C. 154(b) by 873 days.

(21) Appl. No.: 14/851,220

(22) Filed: Sep. 11, 2015

(65) Prior Publication Data

US 2016/0001206 A1    Jan. 7, 2016

Related U.S. Application Data

(62) Division of application No. 13/883,070, filed as application No. PCT/EP2011/069143 on Oct. 31, 2011, now Pat. No. 9,393,506.

(30) Foreign Application Priority Data

Apr. 11, 2010 (DE) .......................... 10 2010 043 431
Nov. 12, 2010 (DE) .......................... 10 2010 043 834

(51) Int. Cl.
*B01D 35/00* (2006.01)
*B01D 35/16* (2006.01)
(Continued)

(52) U.S. Cl.
CPC ......... *B01D 35/005* (2013.01); *B01D 35/147* (2013.01); *B01D 35/153* (2013.01);
(Continued)

(58) Field of Classification Search
CPC ...... B01D 35/00; B01D 35/005; B01D 35/16; B01D 35/30; B01D 35/147; B01D 35/153;
(Continued)

(56) References Cited

U.S. PATENT DOCUMENTS

2003/0132158 A1    7/2003   Clausen et al.
2007/0163947 A1*   7/2007   Clausen ................ B01D 29/21
                                                                210/450
(Continued)

FOREIGN PATENT DOCUMENTS

EP            1235624         5/2003

OTHER PUBLICATIONS

International Search Report, dated Apr. 5, 2012.

*Primary Examiner* — Vishal V Vasisth
(74) *Attorney, Agent, or Firm* — Greer, Burns & Crain, Ltd.

(57) ABSTRACT

A fluid filter insert for a fluid filter having a filter housing, a cover and a central standpipe with a locking device preventing a closing of the cover, comprising a hollow cylindrical filter material body, two end plates enclosing said filter material body at its ends, at least one protruding member carried on the filter insert. The filter insert is configured to be placed onto the standpipe, and the protruding member of the filter insert, when the filter insert is placed onto the standpipe, is configured to actuate the locking device in an unlocking direction and allowing a complete placing of the filter insert. When the filter insert is placed onto the standpipe, the protruding member is brought into engagement with the locking device, wherein the locking device is moved in the unlocking direction by the protruding member.

17 Claims, 31 Drawing Sheets

(51) Int. Cl.
*B01D 35/30* (2006.01)
*B01D 35/147* (2006.01)
*B01D 35/153* (2006.01)

(52) U.S. Cl.
CPC .............. *B01D 35/16* (2013.01); *B01D 35/30* (2013.01); *B01D 35/306* (2013.01); *B01D 2201/0415* (2013.01); *B01D 2201/291* (2013.01); *B01D 2201/305* (2013.01); *B01D 2201/316* (2013.01); *B01D 2201/4007* (2013.01); *B01D 2201/4046* (2013.01); *B01D 2201/4084* (2013.01)

(58) Field of Classification Search
CPC ................ B01D 35/303; B01D 35/306; B01D 2201/04; B01D 2201/16; B01D 2201/29; B01D 2201/291; B01D 2201/30; B01D 2201/301; B01D 2201/306; B01D 2201/307; B01D 2201/40; B01D 2201/4007; B01D 2201/4023; B01D 2201/4046; B01D 2201/4061; B01D 2201/4015; B01D 2201/305; B01D 2201/316

See application file for complete search history.

(56) References Cited

U.S. PATENT DOCUMENTS

| | | |
|---|---|---|
| 2007/0241047 A1 | 10/2007 | Roll et al. |
| 2008/0047132 A1* | 2/2008 | Wieczorek ........... B01D 35/153 29/801 |
| 2008/0053884 A1 | 3/2008 | Marshall et al. |
| 2008/0053886 A1 | 3/2008 | Marshall et al. |
| 2009/0114588 A1 | 5/2009 | Bagci et al. |
| 2010/0044295 A1 | 2/2010 | Honermann et al. |

* cited by examiner

FLUID FILTER WITH REPLACEABLE FILTER INSERT

CROSS-REFERENCES TO RELATED APPLICATIONS

This application is a divisional application of U.S. patent application Ser. No. 13/883,070 filed May 2, 2013, now U.S. Pat. No. 9,393,506 and claims the benefit of the German patent application No. 10 2010 043 431.0 filed on Nov. 4, 2010 and the German patent application No. 10 2010 043 834.0 filed Nov. 12, 2010, the entire disclosures of which are incorporated herein by way of reference.

BACKGROUND OF THE INVENTION

The present invention relates to a fluid filter, in particular an oil or fuel filter, of an internal combustion engine, having a filter housing and a cover detachably connected thereto, having a replaceable filter insert made up of a hollow cylindrical filter material body and two end plates enclosing said body at its ends, the filter insert being capable of being placed onto a central standpipe connected to the filter housing, the standpipe having at its free side facing the cover an end piece that is capable of axial displacement relative to the standpipe, the end piece being preloaded by a force acting in the direction of expulsion, and the end piece, when in its expelled position, being blocked by a locking device against insertion and a connection of the cover to the filter housing being prevented, and unlocking means guided by the filter insert being provided that, when the filter insert is placed onto the standpipe, actuate the locking device in the unlocking direction and allow insertion of the end piece. The present invention also relates to a filter insert for use in the above-named filter.

Increasingly high demands are made on fluid filters, in particular oil or fuel filters of an internal combustion engine, in particular with regard to filtering fineness and the durability of the replaceable filter inserts. These demands can be met only if suitable filter inserts are installed in the fluid filters. A fluid filter in which the installation of an unsuitable foreign filter insert is prevented during a filter maintenance including a change of filter insert is known from US 2003/0132158 A1. This document describes a fluid filter having the features named above. When an attempt is made to place into the filter housing a filter insert that does not have the required unlocking means, the end piece of the standpipe cannot be unlocked and pushed in. The filter insert then cannot be pushed sufficiently far into the housing, and a closing of the filter housing by the cover is excluded, because the cover is held at a distance from the filter housing by the expelled and locked end piece. In the case of an attempt to close the filter housing with the cover when no filter insert is put in place, the expelled, locked end piece also prevents the cover from being attached to the filter housing.

This known fluid filter does meet the demand of preventing the installation of an unsuitable foreign filter insert, but in order to accomplish this a relatively large number of individual parts is required, resulting in a high expense for production and assembly.

SUMMARY OF THE INVENTION

The object of the present invention is therefore to create a fluid filter of the type named above that prevents the use of unsuitable filter inserts and operation of the filter without a filter insert and that has a simple construction having a small number of individual parts, while nonetheless having high functional reliability.

This object is achieved according to the present invention by a fluid filter of the type named above, which is characterized in that the locking device is formed by locking tabs that form a part of the standpipe or of the end piece and that are movable in the radial direction, each having a locking face pointing in the axial direction, and that the locking tabs are preloaded by a force acting in the locking direction, and with their locking faces the tabs lock the end piece, in its expelled position, against axial insertion relative to the standpipe, and that the unlocking means can move the locking tabs immediately in the radial direction into their unlocking position.

Advantageously, the fluid filter according to the present invention requires, in addition to the standpipe, only the displaceable end piece as a further individual part in order to achieve the desired function. Further additional individual parts are not required in order to achieve the desired locking function. In this way, the fluid filter has a very simple construction and can be produced and assembled economically. This is due in particular to the fact that the locking tabs forming the locking device are realized in one piece with the end piece, or are fixedly connected thereto, so that these parts form a unit that can be connected as a whole to the standpipe. Here, an unlocking of the end piece can take place in the desired manner only if, during the installation of the filter insert, the unlocking means required for unlocking the locking tabs are brought into unlocking engagement with the locking tabs in the correct realization and situation. Due to the immediate action of the unlocking means on the locking tabs, a particularly reliable functioning is achieved. Here, despite the simple construction, the installation of unsuitable foreign filter inserts that do not have the fitting unlocking means is prevented.

In a further embodiment of the present invention, it is preferably provided that the locking tabs run in the axial direction. In this way, the locking tabs can be easily realized with a length that is great enough to enable the required radial movability without special joints. For this purpose, at least the locking tabs are made of a flexible material.

In addition, it is preferably provided that the locking tabs are made of a springy material. In this embodiment, the preloading of the locking tabs in the locking direction can easily be produced by the material itself, so that separate springs or similar parts are not required.

The present invention further proposes that the end piece has a hollow cylindrical construction and is placed externally onto the standpipe, and that the locking tabs are provided on the standpipe and each has a locking cam oriented radially outward that can be brought into and out of engagement with a respectively allocated opening in the circumference of the end piece. In this embodiment, a simple and effective guiding of the end piece on the standpipe is achieved. At the same time, the locking tabs are protected by the end piece against damaging external influences, thus promoting long-lasting reliable functioning.

Alternatively, it is possible for the end piece to have a hollow cylindrical construction and to be placed internally into the standpipe, and for the locking tabs to be provided on the end piece and to each have a locking cam oriented radially outward that can be brought into and out of engagement with a respectively allocated opening in the circumference of the standpipe. In this embodiment as well, a simple and effective guiding of the end piece relative to the standpipe is achieved, and the locking tabs are situated so as to be protected. The unlocking means on the filter insert can be the same for both embodiments named above, because in both cases the locking tabs have an unlocking device that points radially inward.

In order to prevent the locking tabs in the unlocking device from being bent in the locking direction or even broken off, either accidentally or through deliberate manipulation, it is proposed that each locking tab have an associated stop that limits its movement in the locking direction.

During maintenance of the filter including removal of the filter insert from the standpipe, when the standpipe is upwardly open there is a relatively great risk that dirt particles will enter into the fluid outlet channel, thus reaching the clean side of the filter, and then causing disturbance or damage to devices connected downstream. In order to effectively prevent this, it is usefully provided that the standpipe has at least one opening in its region guiding the end piece, and that the end piece has at least one opening in its region guided on the standpipe, and that when the end piece is pushed out the openings are out of coincidence in order to outwardly close the fluid outlet channel in the standpipe, and that when the end piece is pushed in the openings coincide in order to together form an overflow opening from the inside of the filter insert into the fluid outlet channel in the standpipe. In this way, entry of dirt particles into the fluid outlet channel when the filter insert is removed from the standpipe is reliably prevented. When the filter insert is placed onto the standpipe and the filter housing is closed, the overflow of fluid from the inside of the filter insert into the fluid outlet channel is then free.

Preferably, the unlocking means are situated on the filter insert or on a separate unlocking means body that can be placed onto the standpipe before the filter insert. In each of these embodiments, the unlocking means are guided by the filter insert when it is inserted into the filter housing, into the desired unlocking engagement with the locking tabs.

A further embodiment provides that the locking tabs each have a dog that protrudes radially in the locking direction, and that when the filter insert is placed onto the standpipe, or when the unlocking means body and the filter insert are placed onto the standpipe, the unlocking means enter into engagement with the dogs and the locking tabs pivot radially in the unlocking direction. In this embodiment, the elements required for the unlocking of the locking tabs when the suitable filter insert is put into place are constructively simple and thus functionally reliable.

In order to ensure a particular rotational position of the unlocking means relative to the end piece that may be required for the unlocking of the end piece, the present invention provides that on the outer circumference of the end piece or on the outer circumference of the standpipe there are provided positioning guide means that work together with the unlocking means or with additionally situated guide means and that force-guide the unlocking means in the circumferential direction into a position suitable for engagement for the locking tabs when the filter insert is placed on, or the unlocking means body and the filter insert are placed on. In this way, the correct installation position of the named parts relative to one another is brought about even without special attention on the part of an operator, and without requiring a precise manual positioning of the filter insert and end piece relative to one another.

In order to achieve a construction that is as simple and reliable as possible with regard to the unlocking means as well, the unlocking means are preferably formed by ribs that protrude radially in the direction of unlocking of the locking tabs. When the filter insert is placed into the filter housing, these ribs ensure a pivoting of the locking tabs in order to allow an insertion of the end piece on the standpipe, and so that the filter insert can be introduced completely into the filter housing.

In order to make it possible to integrate the unlocking means into the filter insert as well as possible, the unlocking means are preferably situated on or integrally formed on a supporting body that forms a part of the filter insert and that is situated inside the filter material body between the end plates. The supporting body can for example be a hollow cylindrical supporting mesh.

Alternatively, the unlocking means can be situated on or integrally formed on a ring that is connected to one of the end plates or to the filter material body of the filter insert, or is made in one piece therewith.

If the unlocking means body is fashioned as a separate component, then it preferably has the basic shape of a perforated hollow cylinder, the unlocking means being situated at a lower annular end of the unlocking means body, and an upper end of the unlocking means body forming a support ring that, in the installed state, lies against the lower side of the end plate near the cover. The support ring provides the correct positioning, seen in the axial direction, of the unlocking means relative to the locking tabs.

For the realization of the unlocking means body as a separate component, it is further provided that the upper end plate and the unlocking means body have interacting locking connection means that can be brought into engagement by an axial movement relative to one another. In this way, the filter insert and the unlocking means body can be locked to one another before the installation of the filter insert or also, after prior placement of the unlocking means body on the standpipe, during the installation of the filter insert, so that during a later removal of the filter insert the unlocking means body is also removed therewith from the filter housing.

A further contribution to achieving a simple and reliable construction is that for the preloading of the end piece with the force acting in the direction of expulsion, preferably at least one pressure spring is situated externally on or internally in the standpipe, and is supported on the one hand on the standpipe and on the other hand on the end piece, and that the end piece is guided on the standpipe on a rail guide that has a stop in the direction of expulsion. In the simplest case, the pressure spring can be a low-cost helical spring. The stop acting in the direction of expulsion ensures that the end piece, after being installed, is not inadvertently separated from the standpipe due to the acting spring force. For this purpose, the rail guide between the standpipe and the end piece can for example have a locking mechanism that permits the introduction of the end piece into the guide, but blocks the end piece from sliding off the guide. In this way, in a simple manner the end piece is connected to the standpipe so as to be movable but captive.

The present invention also creates the possibility of providing differently constructed locking devices and differently constructed unlocking means in order to form a coded lock-key system, such that a particular embodiment of the locking device can be unlocked only using a particular, matching embodiment of the unlocking means. This can contribute to preventing unsuitable filter inserts from being installed in the filter housing.

In the case of multiple fluid filters, a filter circumvention valve is provided that permits a fluid flow immediately from the raw side to the clean side of the filter while circumventing the filter material body, when the filter material body is clogged by dirt particles. A particularly advantageous integration of such a filter circumvention valve in the fluid filter according to the present invention is achieved when, as is proposed in a development of the present invention, in order to form a filter circumvention valve an end face of the end piece facing the cover-side end plate of the filter insert is fashioned as a valve body, and the cover-side end plate of the filter insert has a central opening that forms a valve seat, pointing toward the end piece, for the valve body. Advantageously, in this way no additional individual parts are required for the realization of the filter circumvention valve, because the end piece that can be displaced on the standpipe simultaneously takes over the function of the valve body of the filter circumvention valve, and because the associated sealing seat is provided on the adjacent end plate of the filter insert. The required preloading of the valve body in its closing direction brings about the above-mentioned preloading force acting on the end piece in its direction of expulsion; this force can for example be produced by the above-mentioned pressure spring.

In fluid filters, in many cases it is desirable to enable a draining of the filter housing during a filter maintenance, before removing the filter insert from the filter housing. For this purpose, in the filter insert according to the present invention it is provided that the filter housing has in its base an eccentrically situated drain channel, and that the filter housing has, on the side of the end plate remote from the cover facing away from the filter material body, an axially protruding eccentric closing mandrel for the drain channel, and that interacting positioning guide means are provided, on the inner circumference of the filter insert and on the outer circumference of the standpipe, that force-guide the filter insert in the circumferential direction into a position of the closing mandrel suitable for engagement with the drain channel when the filter insert is placed onto the standpipe. In this embodiment of the fluid filter, on the one hand the drain channel in the base of the filter housing is reliably closed when the filter insert is put into place, because it is ensured that the closing mandrel is positioned in a fitting manner relative to the drain channel. Here, the mentioned positioning guide means for the closing mandrel can be separate means, or can also be formed by the positioning guide means already provided for the engagement-ready positioning of the unlocking means relative to the locking tabs. When the cover of the filter housing is removed during maintenance and the filter insert is moved a distance adequate for the removal of the closing mandrel from the drain channel, the fluid in the filter housing and in the filter insert flows out through the drain channel. In this way, the filter insert can be as empty of fluid as possible when it is removed from the filter housing. Here, as is known, the filter insert can have a locking connection with the cover in order to transmit an axial tensile force on the filter insert when the cover is removed from the filter housing, moving the filter insert in the removal direction together with the cover.

The present invention further proposes a fluid filter, in particular an oil or fuel filter of an internal combustion engine, having a filter housing and a cover detachably connectable thereto, and having a removable filter insert made up of a hollow cylindrical filter material body and two end plates enclosing said body at its ends, of which at least one of which has a central opening, the filter insert being capable of being placed with the opening onto a central standpipe that forms a part of the filter housing, a locking body being guided on the standpipe in axially displaceable fashion, the locking body being preloaded with a force acting in a direction of expulsion pointing toward the free end of the standpipe, the locking element, in an expelled position, being locked by a locking device against insertion, and unlocking means guided by the filter insert being provided that, when the filter insert is pushed onto the standpipe, actuate the locking device in the unlocking direction and allow a pushing on of the locking body and of the filter insert. This fluid filter is characterized in that in order to form a filter circumvention valve an end face, facing the filter insert, of the locking body is fashioned as a valve body, and the end plate facing the locking body of the filter insert has a valve seat for the valve body. Thus, the additional function of a filter circumvention valve is integrated into a freely configurable locking device and the filter insert, resulting in a compact construction and high functional tightness.

Finally, the present invention relates to a filter insert for use in a fluid filter, the filter insert being made up of a hollow cylindrical filter material body and two end plates enclosing said body at its ends, the filter insert being capable of being placed onto a central standpipe connected to the filter housing, and unlocking means guided by the filter insert being provided that, when the filter insert is placed onto the standpipe, actuate a locking device in the unlocking direction and allow a complete pushing on of the filter insert. The filter insert according to the present invention is characterized in that the unlocking means are situated on the filter insert.

BRIEF DESCRIPTION OF THE DRAWINGS

In the following, exemplary embodiments of the present invention are explained on the basis of a drawing.

DETAILED DESCRIPTION OF THE PREFERRED EMBODIMENTS

Figure 1:
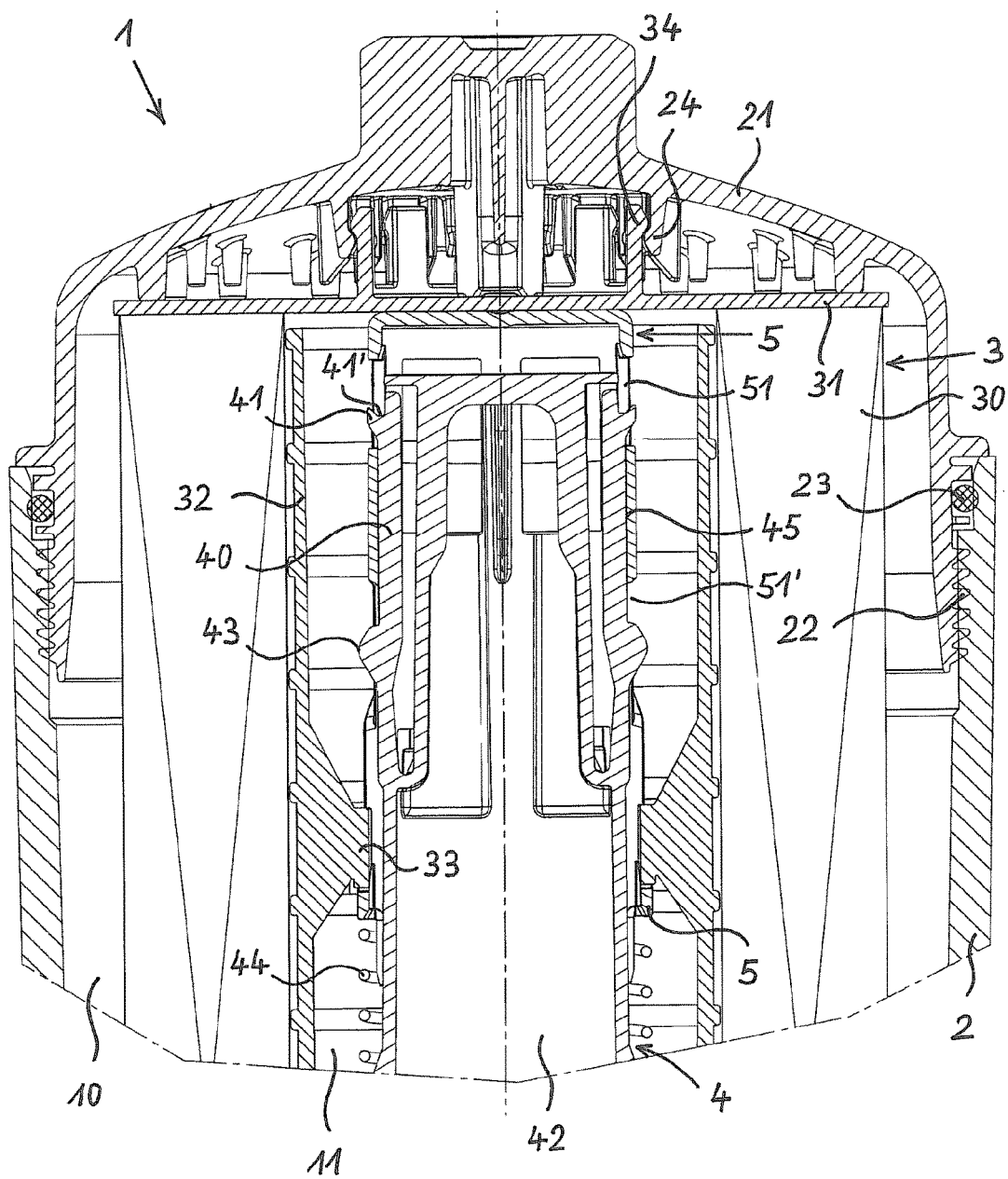
FIG. 1 shows a fluid filter in a first embodiment having a fitting filter insert put into place, in longitudinal section.

FIG. 1 shows a first exemplary embodiment of a fluid filter 1 in a longitudinal section through the upper region of filter 1. Filter 1 has a housing 2 and has a removable cover 21 that seals this housing at its upper side, realized here as a screw cover. Inside housing 2, a standpipe 4 is centrally situated that is connected at its lower end (not shown in FIG. 1) to filter housing 2. From above, a filter insert 3 is placed onto the outer circumference of standpipe 4; when cover 21 is removed, this filter insert can be installed and removed. Filter insert 3 has a hollow cylindrical filter material body 30 and has two end plates 31 and 31' that enclose this filter material body at its ends, of which only upper end plate 31 is visible here. The lower end plate is perforated so that filter insert 3 can be placed onto standpipe 4. On the side of upper end plate 31 facing away from filter material body 30, locking tabs 34 are integrally formed that form a ring of locking tabs and that can be brought into locking engagement with locking tabs 24 situated in matching fashion on the inside of cover 21. In this way, cover 21 can exert an upward axial tensile force on filter insert 3 when cover 21 is separated from filter housing 2, in order to carry filter insert 3 along with this movement.

Inside filter material body 30, enclosed between end plates 31 and 31', there is situated a hollow cylindrical perforated supporting body 32 that supports filter material body 30 against collapse when fluid flows through it in the radial direction from the outside toward the inside. Accordingly, a raw side 10 of filter 1 is situated radially outward from filter material body 30, and a clean side 11 of filter 1 is situated radially inward from filter material body 30.

On the upper end region of standpipe 4 there is situated a hollow cylindrical end piece 5 that is flat at its end face, guided by a rail guide 45 on standpipe 4 so as to be movable in the axial direction thereof. A helical pressure spring 44 that surrounds standpipe 4 and lies against the underside of end piece 5 preloads end piece 5 with a force in its direction of expulsion, i.e. upward in FIG. 1, relative to standpipe 4.

In the region of end piece 5, on standpipe 4 there are provided locking tabs 40 formed in one piece thereon, which here are situated opposite one another and are pivotable in the radial direction. Standpipe 4 with locking tabs 40 is made of a flexible, springy material, and locking tabs 40 are realized so as to have an inherent resisting force directed outward in the radial direction. Each locking tab 40 has on its free upward-pointing end a locking cam 41 that protrudes radially outward and that forms on its upper side in each case a locking surface 41' pointing in the axial direction. In the pushed-in state of end piece 5 shown in FIG. 1, locking cams 41 are situated in upper openings 51 of end piece 5.

At an axial distance underneath locking cams 41, a dog 43 is integrally formed on each locking tabs 40, said dog protruding radially outward through a lower opening 51' of end piece 5. Rib-shaped unlocking means 33 are integrally formed on supporting body 32 of filter insert 3, in a configuration that mates with dogs 43 and locking tabs 40, said unlocking means pointing radially inward from supporting body 32. When filter insert 3 is placed into filter housing 2 and the unlocking means pass over dogs 43, unlocking means 33 ensure that locking tabs 40 are pivoted inward in the radial direction into a release position, as is explained in more detail below on the basis of FIGS. 5 and 6. In the release position of locking tabs 40, end piece 5 can be moved downward, past locking tabs 41 with locking surfaces 41'; i.e. end piece 5 can be pushed in relative to standpipe 4. This pushing-in movement is brought about by placing cover 21 onto filter housing 2. After unlocking means 33 move past dogs 43, locking tabs 40 snap into the position shown in FIG. 1. After cover 21 has been screwed tight, filter housing 2 is sealed so as to be fluid-tight by seal 23 associated with screw thread 22.

Figure 2:
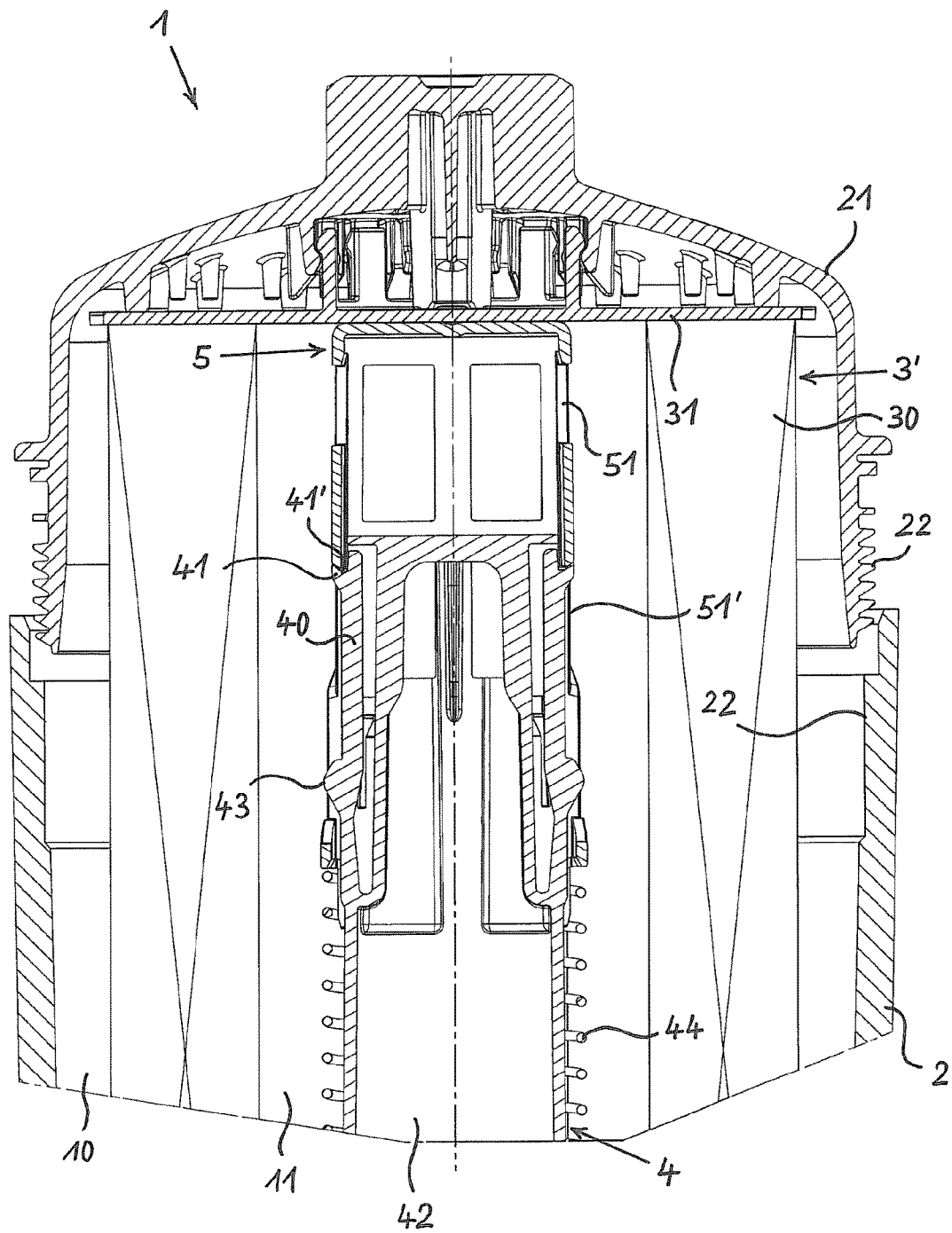
FIG. 2 shows the fluid filter of FIG. 1 with a non-fitting, foreign filter insert placed therein, in longitudinal section.

FIG. 2 shows fluid filter 1 of FIG. 1 in a state that results when an attempt is made to install a non-fitting foreign filter insert 3', i.e. an insert not having fitting unlocking means, into filter housing 2. If, starting from the state shown in FIG. 1, cover 21 is removed, spring 44 pushes end piece 5 on standpipe 4 upward until locking cams 41 of locking tabs 40 each move into locking engagement with one of the lower openings 51' of end piece 5. If an attempt is now made to move end piece 5 downward, the upper edges of lower openings 51' of end piece 5 run into locking surfaces 41' (which point upward in the axial direction) of locking cams 41, and further movement is prevented. If it is then nonetheless attempted to close filter housing 2 with cover 21 as shown in FIG. 2, then cover 21 runs into, with upper end plate 31 of foreign filter insert 3', the upper end of end piece 5 before screw thread 22 on cover 21 can engage with screw thread 22 of filter housing 2. In this way, cover 21 is prevented from closing housing 2. Here, the pushing in of end piece 5 is prevented by the fact that dogs 43 on standpipe 4 are not actuated by unlocking means, because these specific unlocking means are not present on foreign filter insert 3'. Therefore, operation of fluid filter 1 with a foreign filter insert 3' not having the specific matching unlocking means 33 (see FIG. 1) is impossible.

Figure 3:
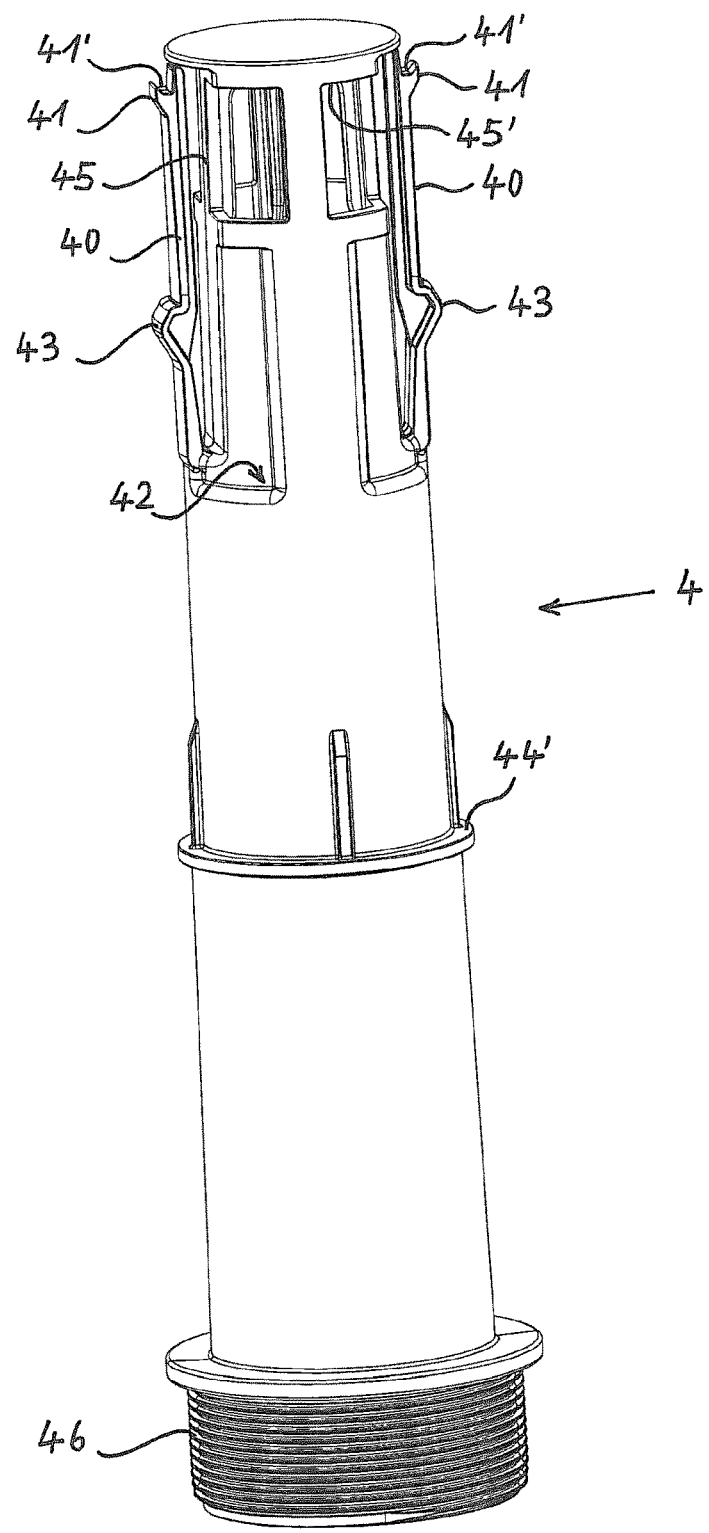
FIG. 3 shows a standpipe of the fluid filter of FIGS. 1 and 2 as an individual part, in a front view.

FIG. 3 of the drawing shows standpipe 4 of fluid filter 1 according to FIG. 1 as an individual part, in a front view. In its upper region, standpipe 4 has locking tabs 40, having locking cams 41 integrally formed on its free end, and has locking surfaces 41' pointing in the axial direction. Axially underneath locking cams 41, each locking tab 40 has dogs 43 for actuating locking tab 40 in the unlocking direction, i.e. in the radial direction inward.

Rail guide 45 for end piece 5 (not shown here) runs parallel to locking tabs 40. Inside standpipe 4 there runs a fluid outlet channel 42 for the filtered, clean fluid. At a point approximately halfway along its height, standpipe 4 has an annular circumferential spring support 44' on which spring 44, shown in FIG. 1, is supported with its lower end. At the bottom of FIG. 3, lower end 46 of standpipe 4 is visible, end 46 here being realized with an outer threading by which standpipe 4 can be screwed into a matching counter-threading of filter housing 2.

Figure 4:
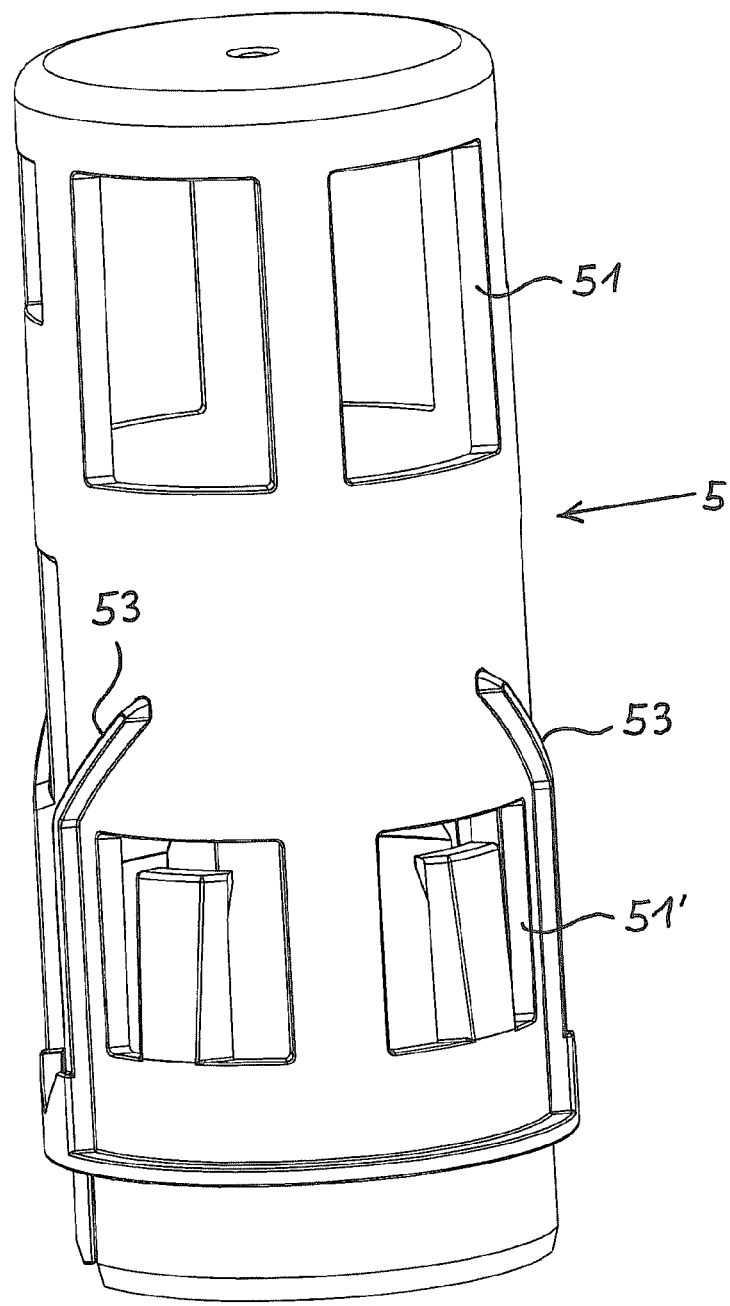
FIG. 4 shows an end piece that can be connected in displaceable fashion to the standpipe of FIG. 3, as an individual part, in a front view.

FIG. 4 shows end piece 5 of fluid filter 1 of FIG. 1 in an enlarged representation, as an individual part in a front view. At the top of end piece 5, upper openings 51 thereon are visible; at an axial distance further down, lower openings 51' are visible. Moreover, on the outer circumference of end piece 5 there are integrally formed positioning guide means 53 that are here realized as webs that, seen from the top downward, first run into one another and then run downward parallel to one another. When a filter insert 3 is put into place, these positioning guide means 53 work together with unlocking means 33 of filter insert 3 or with special guide means 33' provided on filter insert 3 (see FIG. 16) in such a way that, seen in the circumferential direction, unlocking means 33 are force-guided into a position suitable for engagement relative to locking tabs 40, or dogs 43 thereof.

Figure 5:
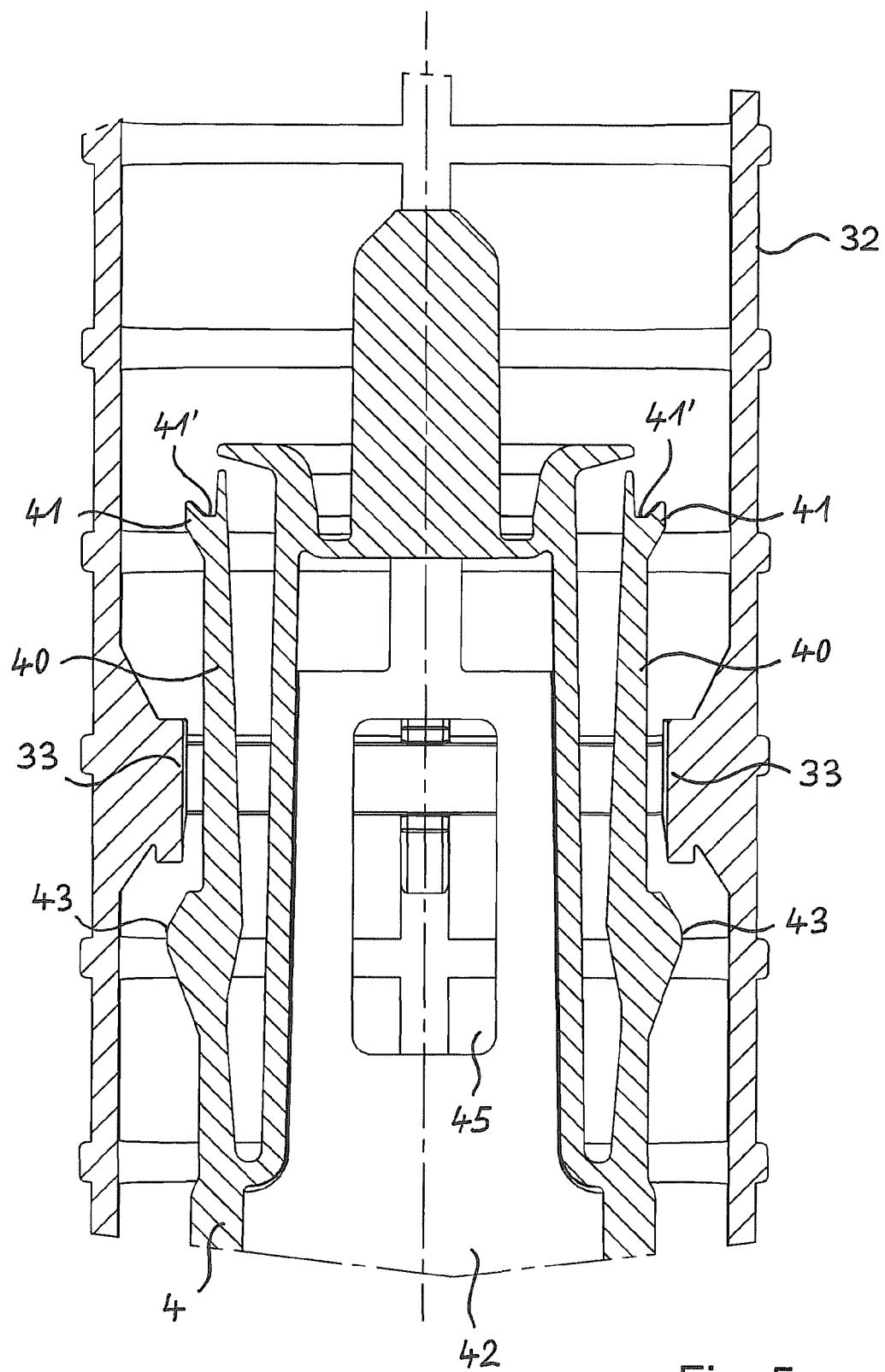
FIG. 5 shows an upper end region of the standpipe of FIG. 3 and a supporting body of a filter insert in an enlarged detail, with a locking device in the locking position, in longitudinal section.
Figure 6:
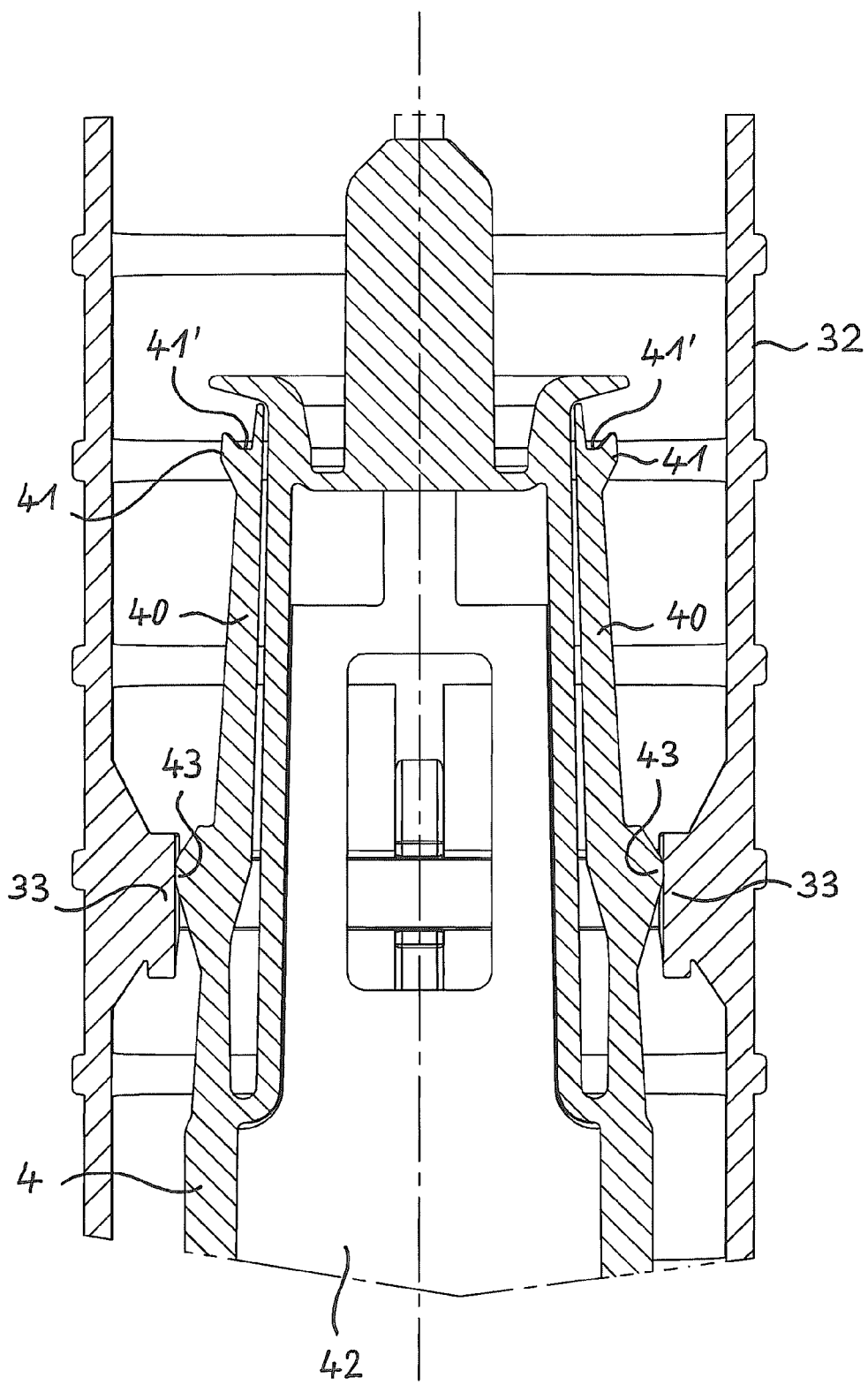
FIG. 6 shows the upper end region of the standpipe of FIG. 3 and the supporting body of the filter insert in the same representation as in FIG. 5, but here with the locking device in the release position.

FIGS. 5 and 6 show an enlarged detail of the interaction of unlocking means 33 with dogs 43. FIGS. 5 and 6 each show only the upper region of standpipe 4, and a center region of support body 32, as a part of filter insert 3, which is otherwise not shown.

In FIG. 5, support body 32 is in a position in which its rib-shaped unlocking means 33 are still situated directly above dogs 43 of locking tabs 40. In this state, locking tabs 40 are pivoted radially outward, thus assuming their locking position. In this locking position of locking tabs 40, end piece 5 (not shown in FIG. 5) cannot be pushed downward in the axial direction of standpipe 4.

In the state shown in FIG. 6, support body 32, as a part of filter insert 3, is pushed somewhat further downward, so that now unlocking means 33 stand in immediate engagement with dogs 43 of locking tabs 40. Due to this immediate engagement, locking tabs 40 are pivoted inward in the radial direction, into their release position. In this release position of locking tabs 40, locking cams 41 thereof are situated radially inward from end piece 5 (not shown in FIG. 6), so that end piece 5 can be moved in the axial direction from the top downward, in particular due to the upper end plate of filter insert 3, belonging to support body 32.

Figure 7:
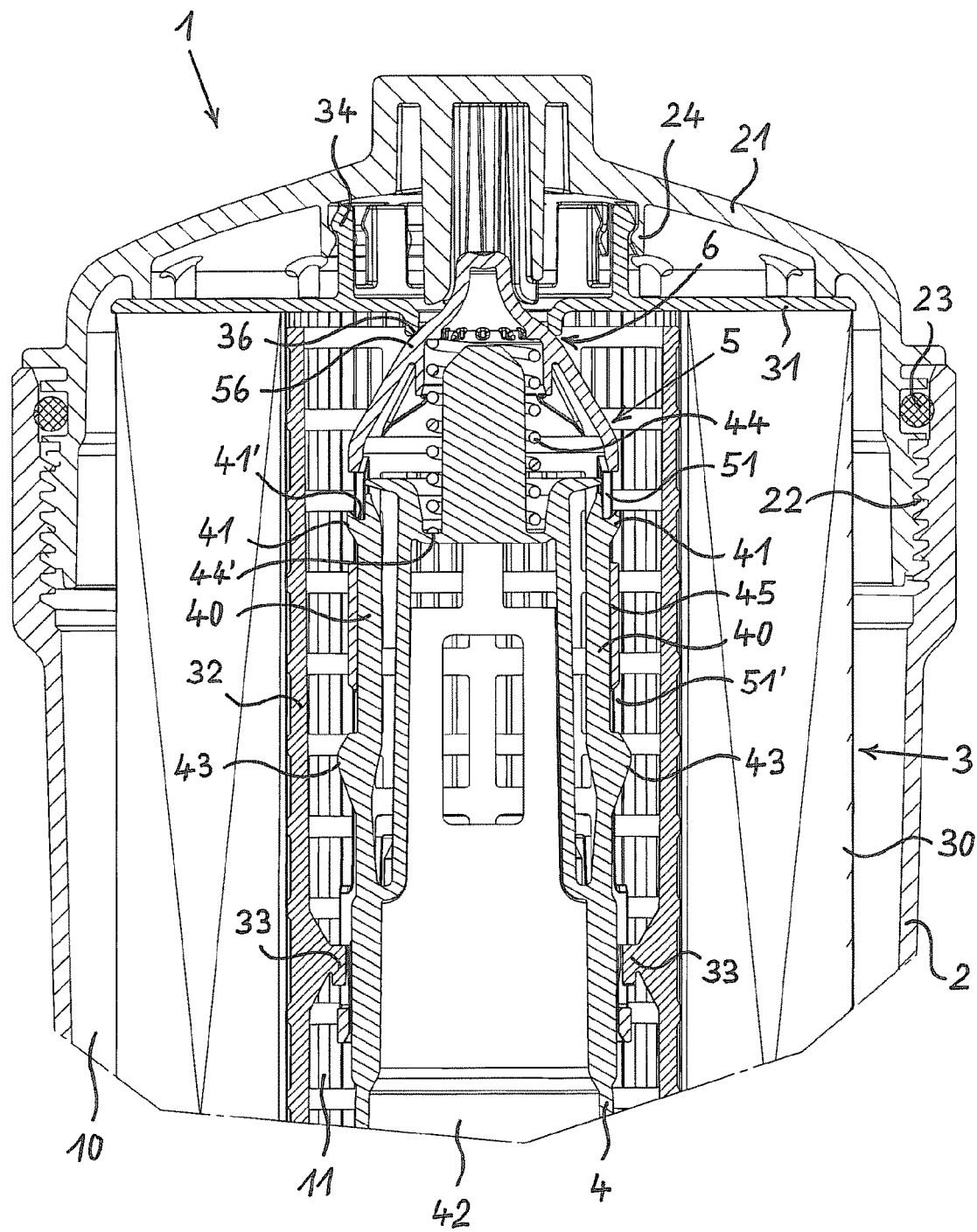
FIG. 7 shows the fluid filter in a second embodiment, with a fitting filter insert put into place and with a filter circumvention valve (closed here), in longitudinal section.

FIG. 7 shows a second embodiment of fluid filter 1, again in longitudinal section through the upper part of filter 1; it is characteristic of this exemplary embodiment that it additionally has a filter circumvention valve 6.

Filter housing 2, its cover 21, and standpipe 4 correspond to the embodiment shown in FIG. 1, and reference is made to the description thereof. In the example shown in FIG. 7, end piece 5 is not realized with a flat upper end face, but rather is realized as a conical-round valve body 56.

Filter insert 3 according to FIG. 7 differs from filter insert 3 according to FIG. 1 in that upper end plate 31 is not closed, but rather has a central opening that forms a valve seat 36. Valve body 56 works together with valve seat 36 to form filter circumvention valve 6. Spring 44, which here is situated inside standpipe 4 between it and end piece 5, preloads end piece 5, which forms valve body 56, with a force in the direction toward valve seat 36. When the pressure of the fluid on clean side 10 of filter 1 exceeds a level determined by the force of spring 44 and the surface of valve body 56 on which the fluid acts, then filter circumvention valve 6 opens and creates an immediate flow connection from raw side 10 to clean side 11. This takes place in particular when filter material body 30 of filter insert 3 is clogged by dirt particles.

In other respects, filter insert 3 corresponds to the example shown in FIG. 1, and thus also has inside it support body 32 having rib-shaped unlocking means 33 on its inner circumference. Unlocking means 33 work together with outward-pointing dogs 43 of locking tabs 40 of standpipe 4 when fitting filter insert 3 with unlocking means 33 is installed in filter housing 2. Here, locking tabs 40 are pivoted by unlocking means 33 into their release position, enabling a displacement of end piece 5 into the pushed-in position shown in FIG. 7. In this way, a proper functioning of filter 1 with filter circumvention valve 6 is ensured.

Figure 8:
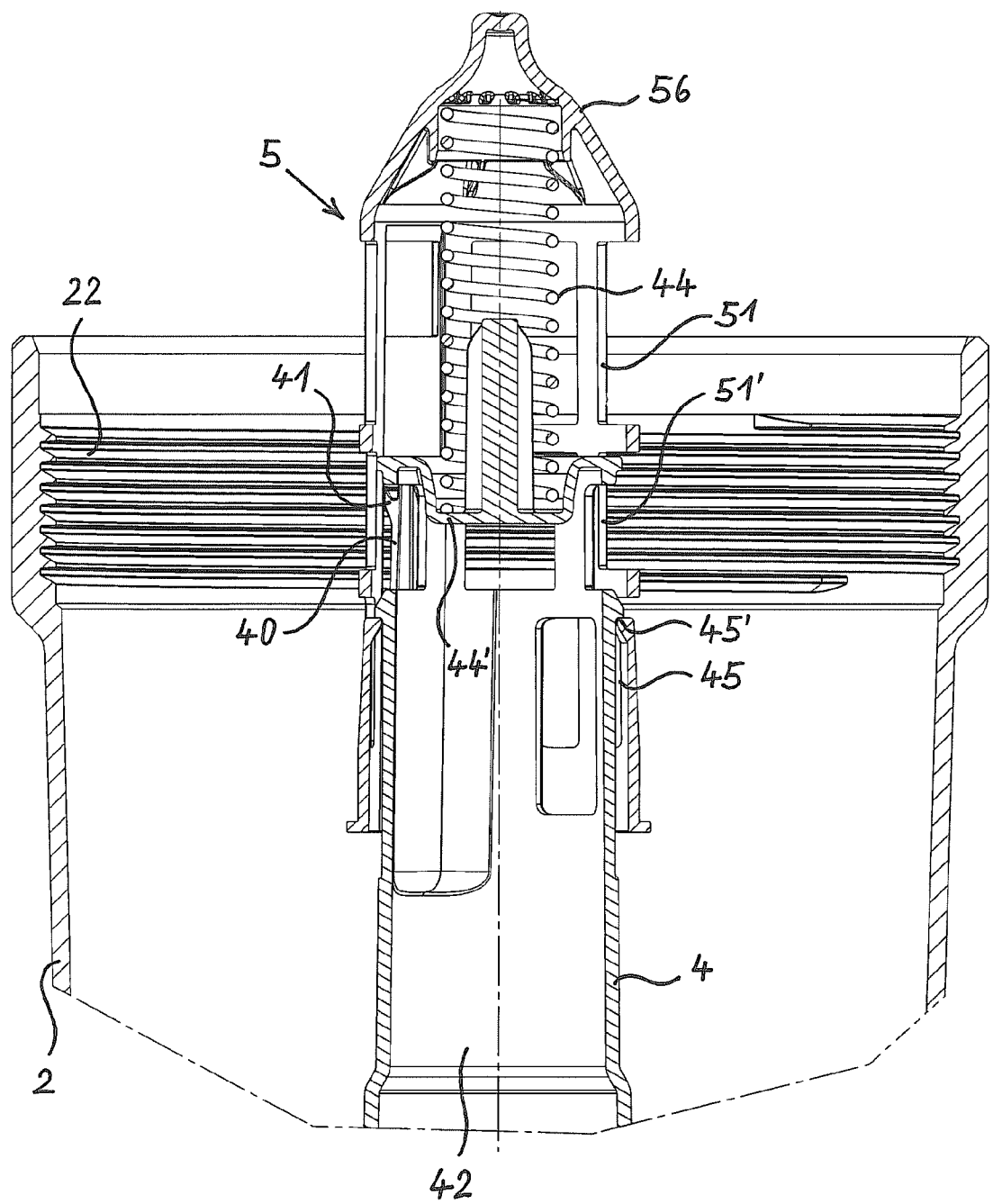
FIG. 8 shows the open filter housing of the fluid filter of FIG. 7 without a filter insert, in longitudinal section.

FIG. 8 shows filter housing 2 of filter 1 of FIG. 7, here after removal of cover 21 and removal of filter insert 3. The force of spring 44 is now able to push end piece 5, in its rail guide 45, out relative to standpipe 4, into the end position shown in FIG. 8. In this end position, end piece 5 is blocked against further axial movement by a stop 45' provided on standpipe 4, so that end piece 5 cannot be detached from standpipe 4. Displacement of end piece 5 in the opposite direction, i.e. downward, is now prevented by locking cams 41 of locking tabs 40, which are each situated in a lower opening 51' of end piece 5.

Figure 9:
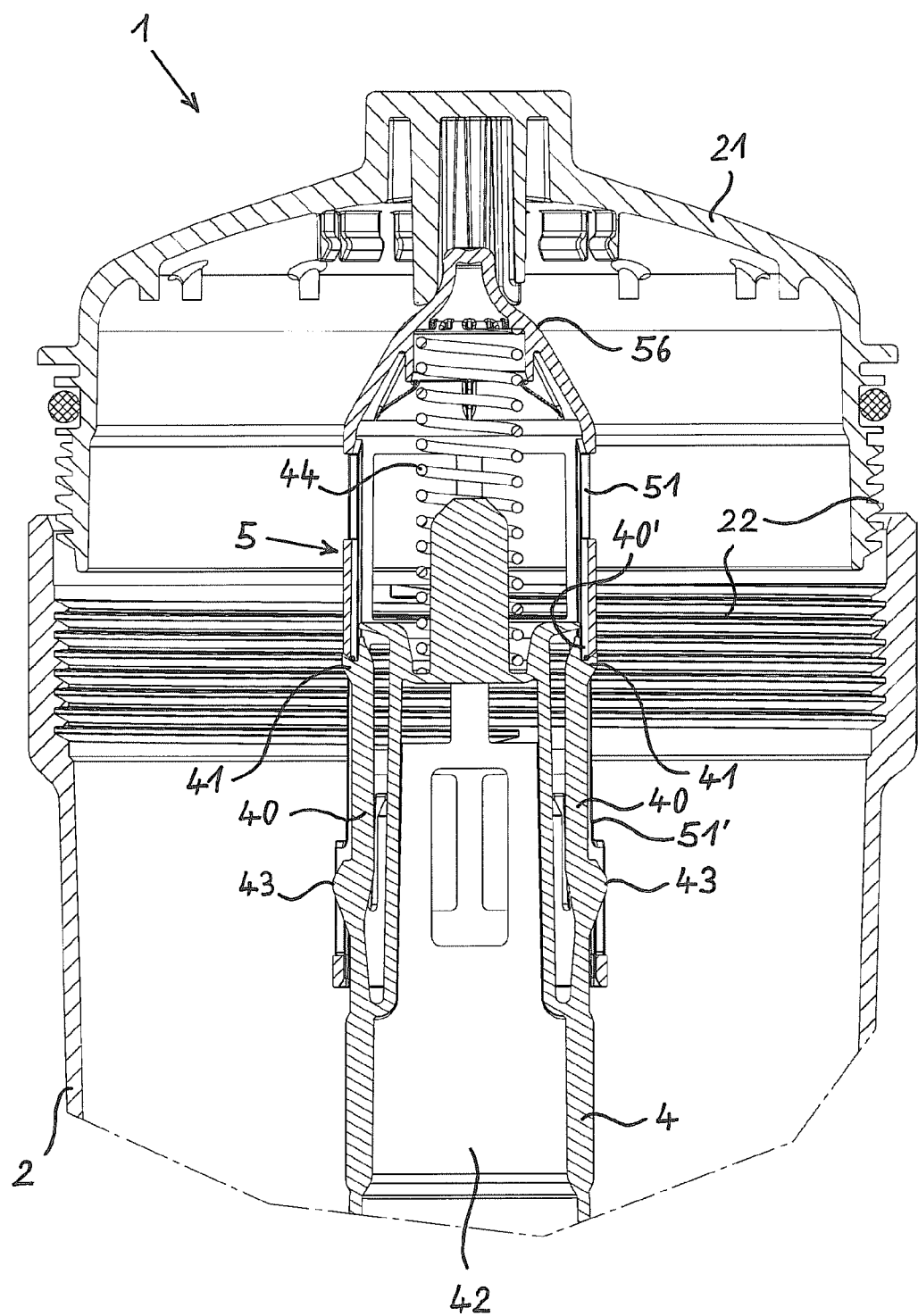
FIG. 9 shows the filter housing of the fluid filter of FIG. 7 with an associated housing cover and without a filter insert, in longitudinal section.

Attachment of cover 21 is now not possible, as is illustrated by FIG. 9, so that operation of fluid filter 1 without an installed, fitting filter insert 3 is also excluded. When an attempt is made to attach cover 21 on filter housing 2, the lower side of cover 21 runs into end piece 5 before screw threads 22 on cover 21 and on filter housing 2 can be brought into engagement with one another. Because end piece 5 is blocked against axial displacement downward, cover 21 cannot be moved closer to filter housing 2, past the position shown in FIG. 9.

In order to prevent locking tabs 40 from being bent in the locking direction, or even broken off, whether accidentally or due to deliberate manipulation, each locking tab 40 has an associated stop 40' that limits its movement in the locking direction. Here, stop 40' is formed in a simple manner by the inner surface of standpipe 4 above the upper edge of lower opening 51'. In the locking position of locking tab 40, the axially outer, free end of locking tab 40 lies against stop 40', and a further movement of locking tab 40 in the locking direction, i.e. further radially outward, is prevented.

Figure 10:
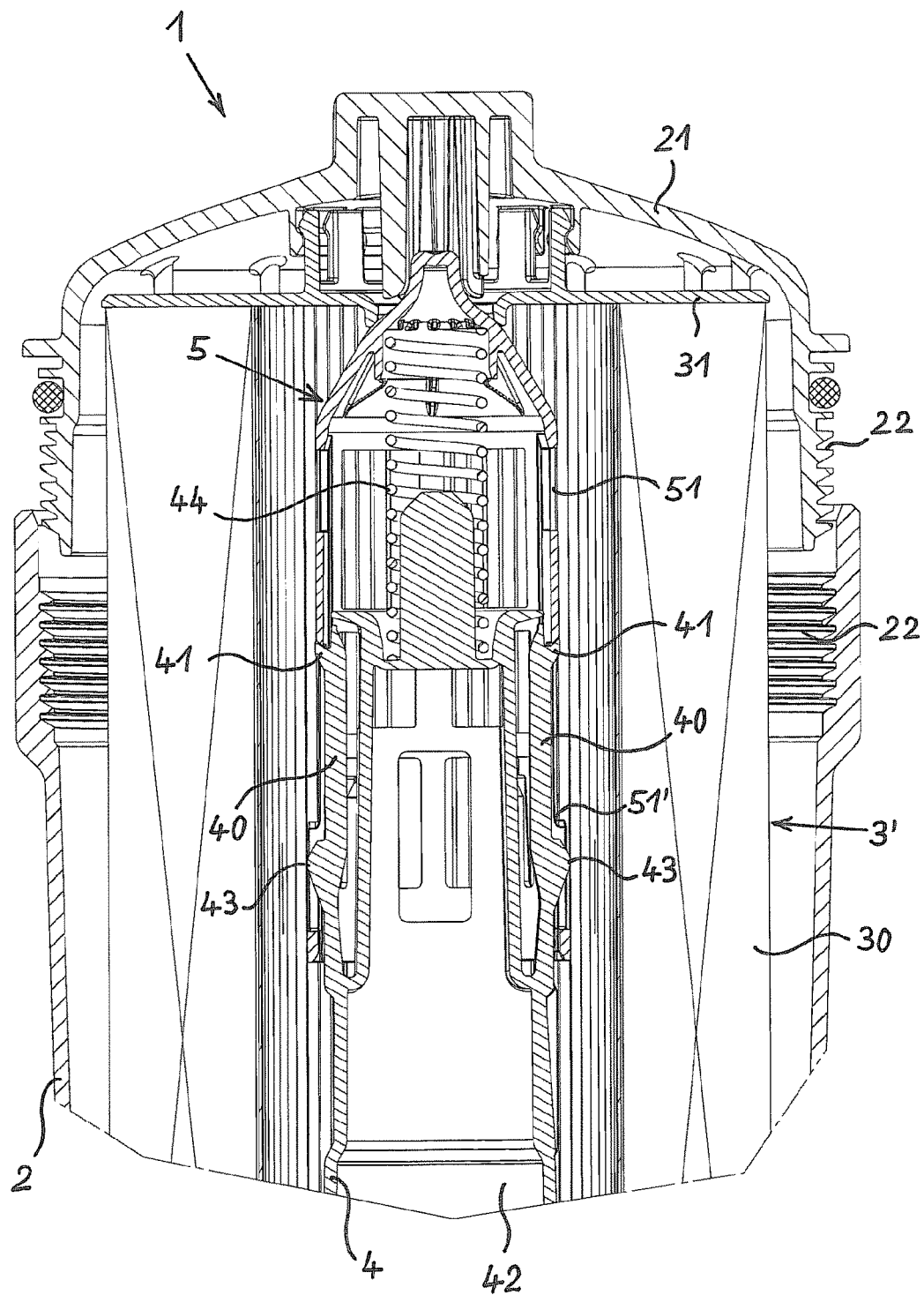
FIG. 10 shows the fluid filter of FIG. 7 with a non-fitting, foreign filter insert placed therein, in longitudinal section.

FIG. 10 shows the situation when a non-fitting, foreign filter insert 3' not having the required unlocking means 33 is placed into filter housing 2. Filter insert 3' can at first be placed onto standpipe 4 to a certain extent, but upper end plate 31 then runs into end piece 5, which is pushed out upwardly and arrested in this position. Due to a lack of actuation of locking tabs 40, it is not possible to push in end piece 5 in the unlocking direction, so that further movement of cover 21 past the position shown in FIG. 10, in the direction toward filter housing 2, is also prevented. Thus, here as well screw threads 22 on cover 21 and on filter housing 2 cannot be brought into engagement with one another, and closing of filter housing 2 is not possible. In this way, operation of fluid filter 1 with an unsuitable foreign filter insert 3' is prevented.

Figure 11:
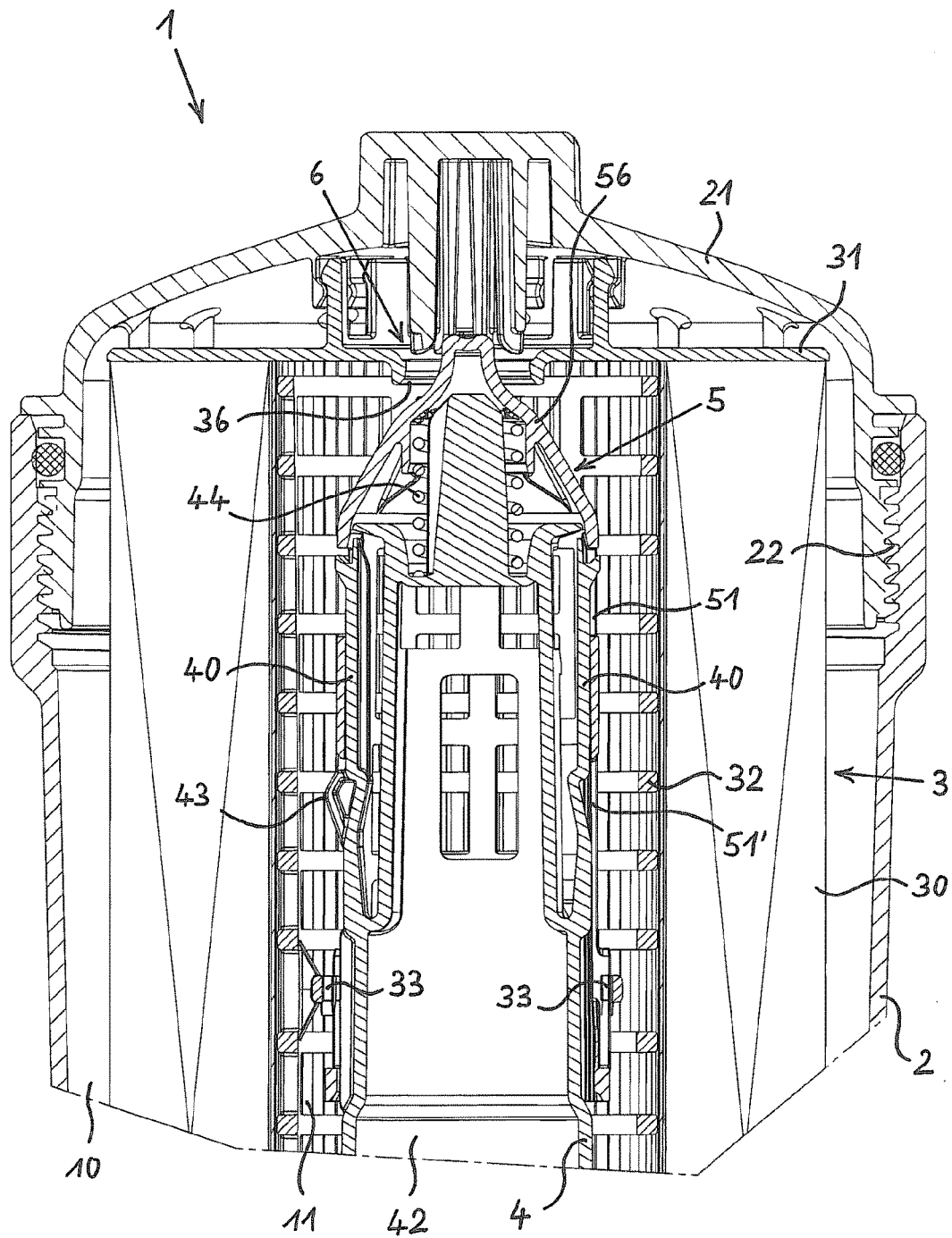
FIG. 11 shows the fluid filter of FIG. 7 with the fitting filter insert put into place and with the filter circumvention valve (here open), in longitudinal section.

FIG. 11 shows fluid filter 1 of FIG. 7, but here with open filter circumvention valve 6. In this open state of filter circumvention valve 6, an increased fluid pressure difference between raw side 10 and clean side 11 ensures that valve body 56, formed by end piece 5, is pushed downward in the direction toward standpipe 4 against the force of spring 44, causing valve body 56 to be lifted off of its valve seat 36 formed in end plate 31. In this way, an immediate flow path is released from raw side 10 of filter 1 to its clean side 11, in order to enable a fluid flow even when filter material body 30 is clogged by dirt particles and has become impermeable. Of course, a precondition for this desired functioning of filter circumvention valve 6 is that filter insert 3 has not only valve seat 36 but also has unlocking means 33 that match with locking tabs 40 and with dogs 43 thereof.

Figure 12:
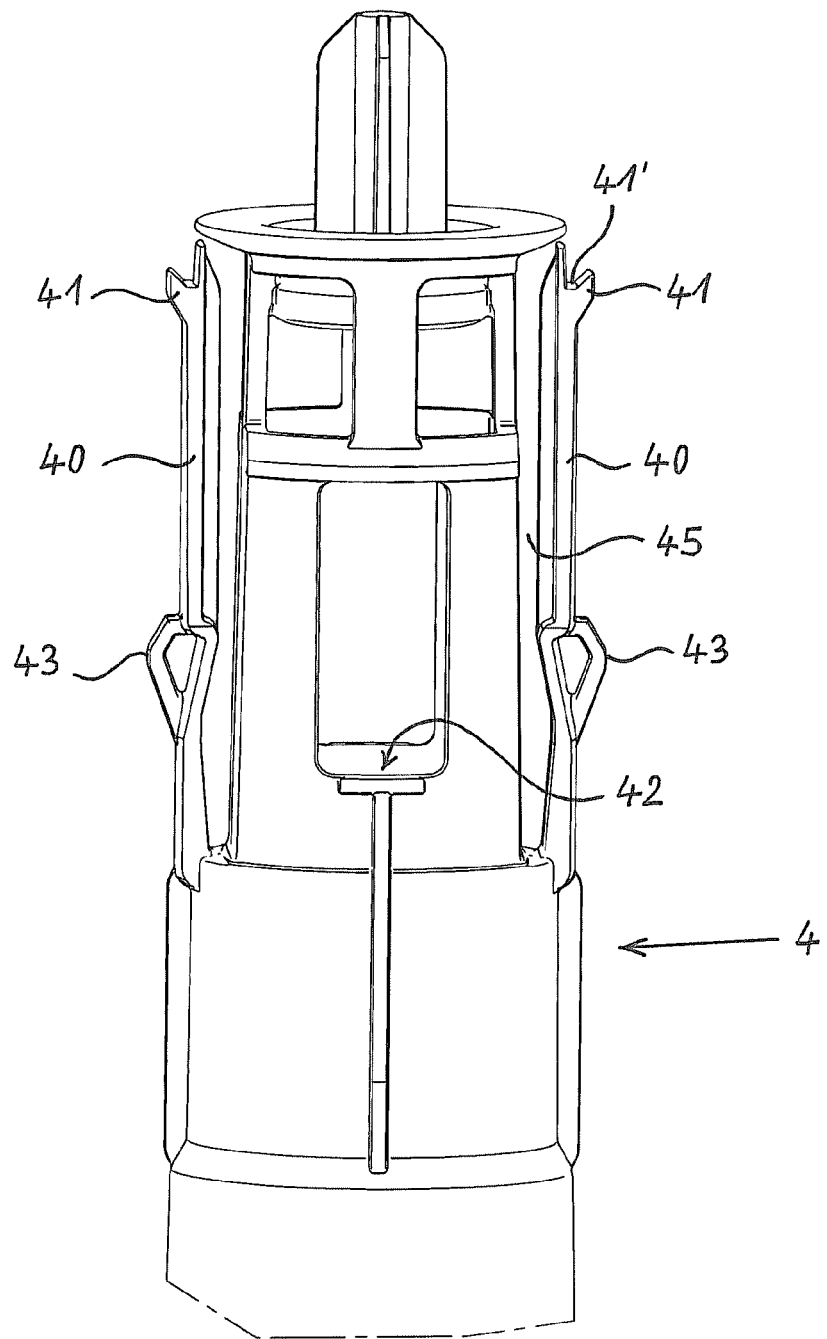
FIG. 12 shows the upper end region of a standpipe of the fluid filter of FIGS. 7 through 11, as an individual part, in a front view.

FIG. 12 shows the upper region of standpipe 4 from fluid filter 1 according to FIGS. 7 through 11. At the left and at the right, a respective locking tab 40 on standpipe 4 can be seen that can be pivoted inward in the radial direction from the locking position shown in FIG. 12. At the upper end of each locking tab 40 there is integrally formed a radially outward-pointing locking cam 41, forming in each case a locking surface 41' that points upward in the axial direction and that works together immediately in locking fashion with end piece 5 (not shown in FIG. 12). At an axial distance underneath locking cams 41, on each locking tab 40 dog 43 is integrally formed so as to protrude outward, so that when a filter insert 3 (not shown in FIG. 12) is placed on, said dog will work together with unlocking means 33 of said filter insert.

Rail guide 45 for end piece 5 runs parallel to locking tabs 40 on standpipe 4. Fluid outlet channel 42 runs through the hollow interior of standpipe 4. Valve body 56 forms the upper end region of end piece 5.

Figure 14:
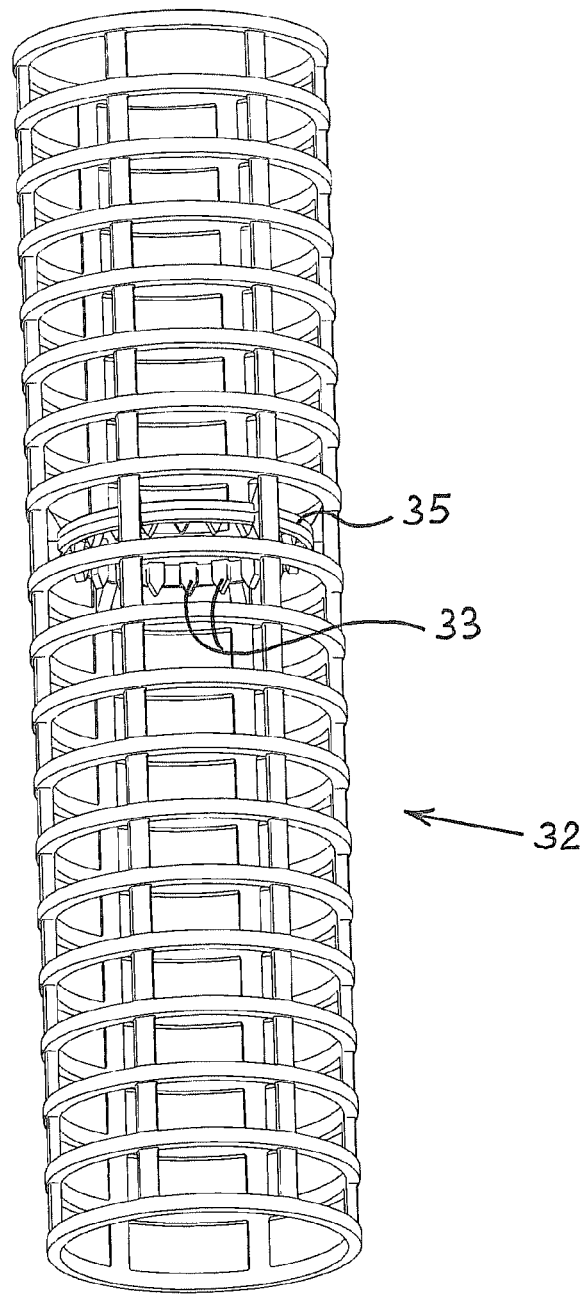
FIG. 14 shows a supporting body of a filter insert with integrated unlocking means, in a front view.

FIG. 14 shows support body 32, used in fluid filter 1 according to FIG. 7 inside filter insert 3, as an individual part in a front view. Approximately at the center along the height of support body 32, on the inner circumference thereof there is integrally formed a circumferential ring 35, preferably fashioned in one piece, having on its inner circumference unlocking means 33, which in this case are tooth-shaped. Due to the relatively large number of unlocking means 33 on ring 35, a particular orientation of support body 32, and thus of filter insert 3 in the circumferential direction relative to standpipe 4, is not required, because one of the unlocking means 33 always meets one of the dogs 43 of locking tabs 40.

Figure 15:
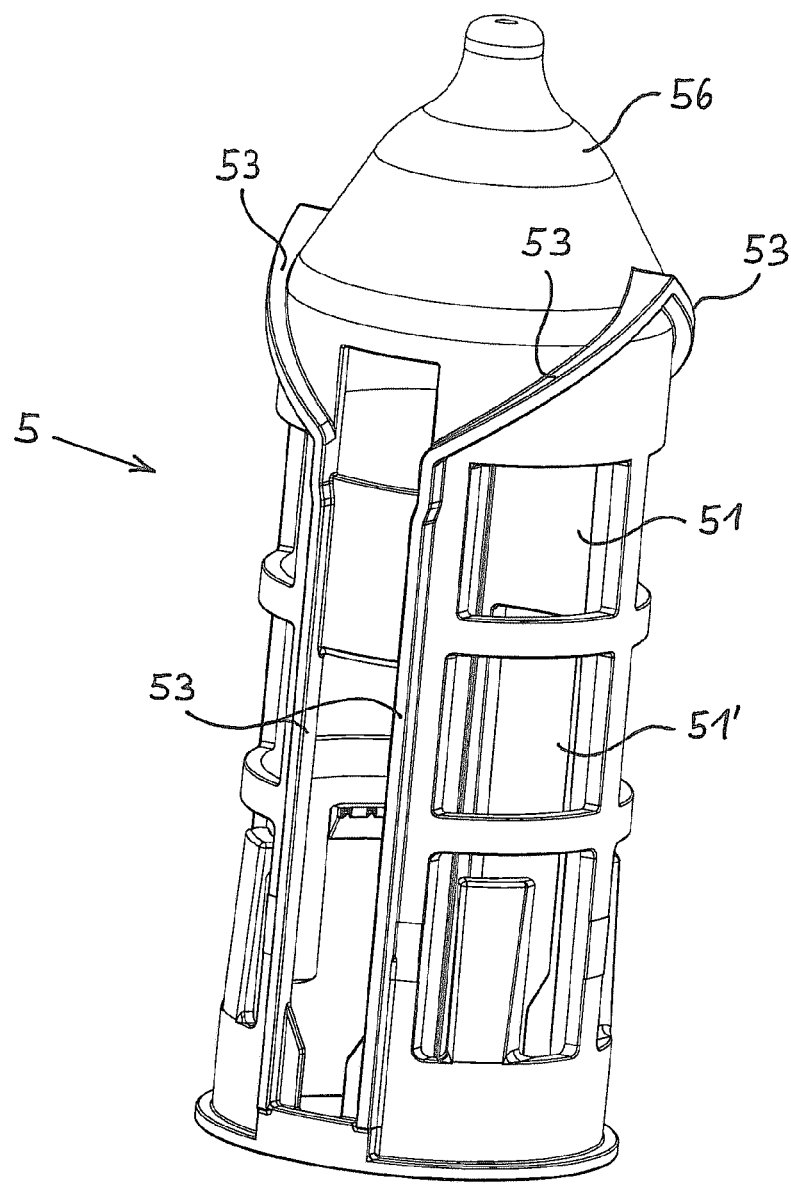
FIG. 15 shows the end piece in a further embodiment, as an individual part, in a front view.

FIG. 15 shows, in a front view, an example of an end piece 5 having the characteristic feature that it has positioning guide means 53. Positioning guide means 53 are provided symmetrically in pairs, and form guide paths that run so as to meet one another and then run parallel to one another in the axial direction down to the lower end of end piece 5. When a filter insert 3 is put into place having two fitting unlocking means 33, given any arbitrary rotational positioning of filter insert 3 and end piece 5 relative to one another, unlocking means 33 are first placed at an arbitrary position on one of the guide paths of positioning guide means 53, and then slide along this path until reaching the axial segment of positioning guide means 53. In this way, unlocking means 33 are force-guided into an engagement-ready position relative to locking tabs 40 and dogs 43 thereof.

Seen in the circumferential direction, a plurality of upper and lower openings 51 and 51' are situated between positioning guide means 53. Here, the upper end of end piece 5 again forms a valve body 56.

Figure 16:
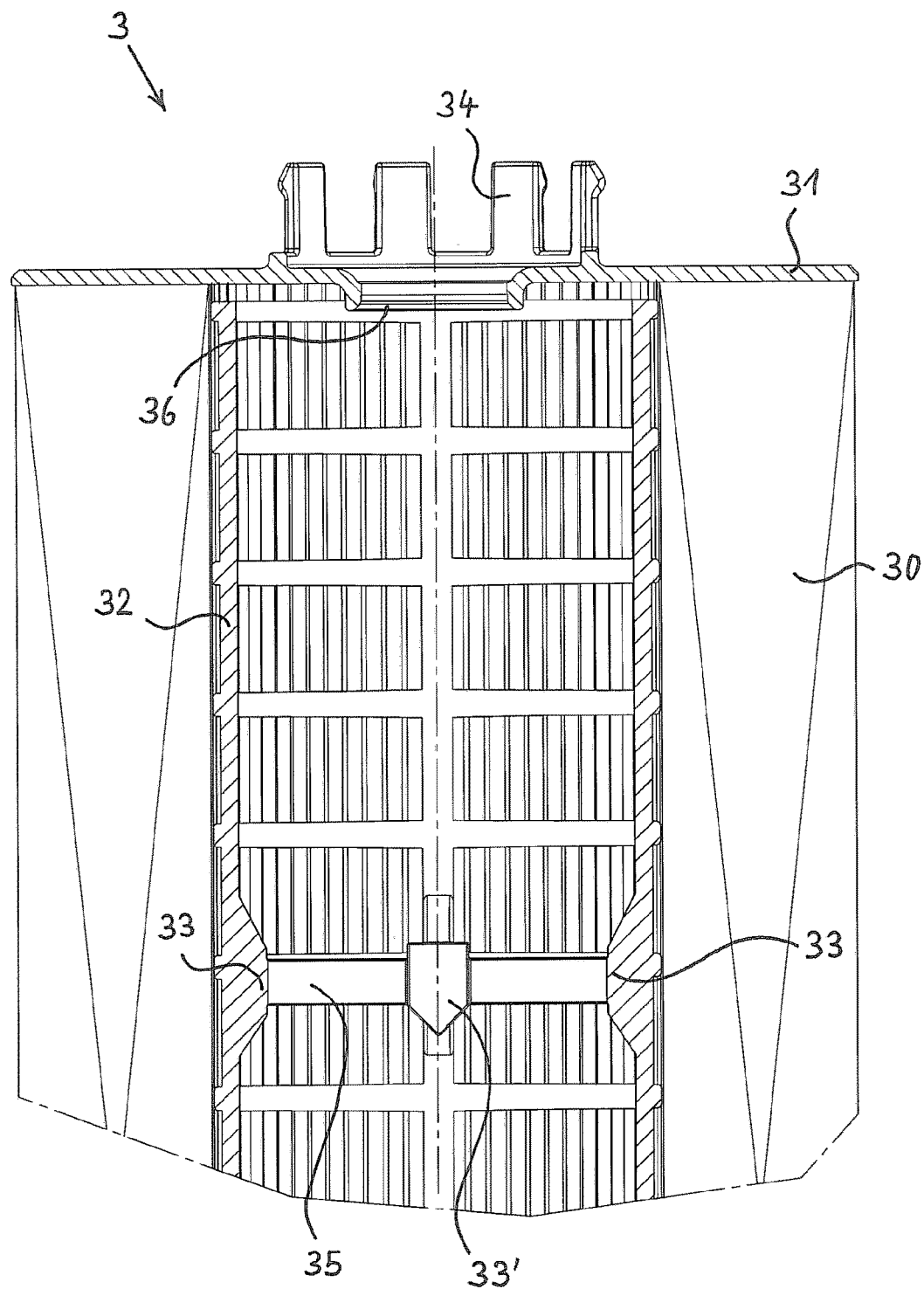
FIG. 16 shows a filter insert in an embodiment fitting the end piece of FIG. 15, in a partial longitudinal section through its upper part.

FIG. 16 shows the upper part of a filter insert 3 in a longitudinal section. Upper end plate 31 of filter insert 3, with valve seat 36, and a part of filter material body 30 are visible. At the upper side, locking tabs 34 are integrally formed in one piece on end plate 31. Inside filter material body 30, a part of support body 32 is visible, on which ring 35, running in the circumferential direction, is integrally formed. A respective unlocking means 33 is visible at the left and at the right on ring 35, on the inner circumference thereof; respectively displaced by 90° thereto in the circumferential direction, two guide means 33' are integrally formed on ring 35 (due to the longitudinal section, only one of guide means 33' is visible). Guide means 33' are used to position filter insert 3 in the circumferential direction relative to an end piece 5 (not shown in FIG. 16) or standpipe 4.

Figure 17:
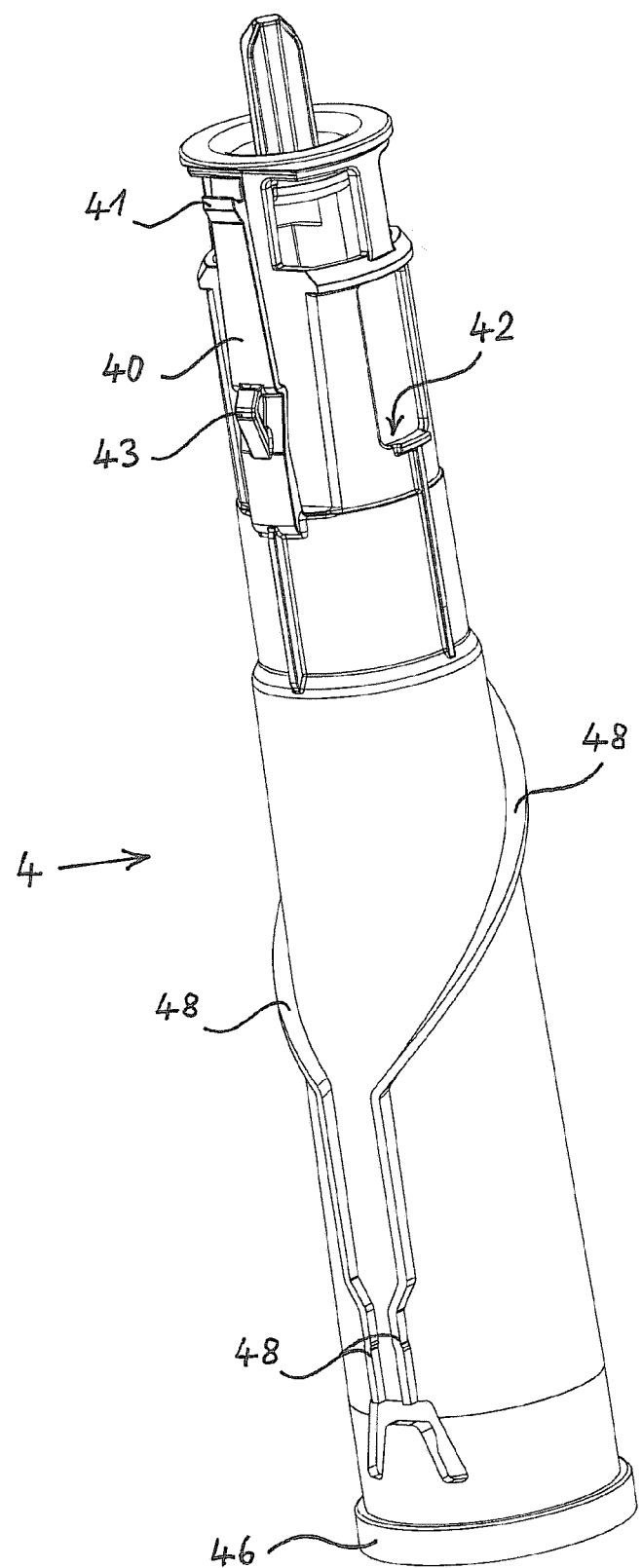
FIG. 17 shows the standpipe in a further embodiment, as an individual part, in a front view.

FIG. 17 shows an example of a standpipe 4 as an individual part in a front view, positioning guide means 48 being integrally formed on the outer circumference of standpipe 4 in the form of two guide paths. Seen from top to bottom, positioning guide means 48 run as a pair of webs, at first with an inclination, in mirror-symmetrical fashion over the outer circumference of standpipe 4, meeting one another and then continuing as two webs running parallel to one another in the axial direction. In the upper end region of standpipe 4, one of locking tabs 40 is visible, with locking cam 41 situated on its free end and with its dog 43 situated further down for actuation. Fluid outlet channel 42 runs through the interior of standpipe 4.

Figure 18:
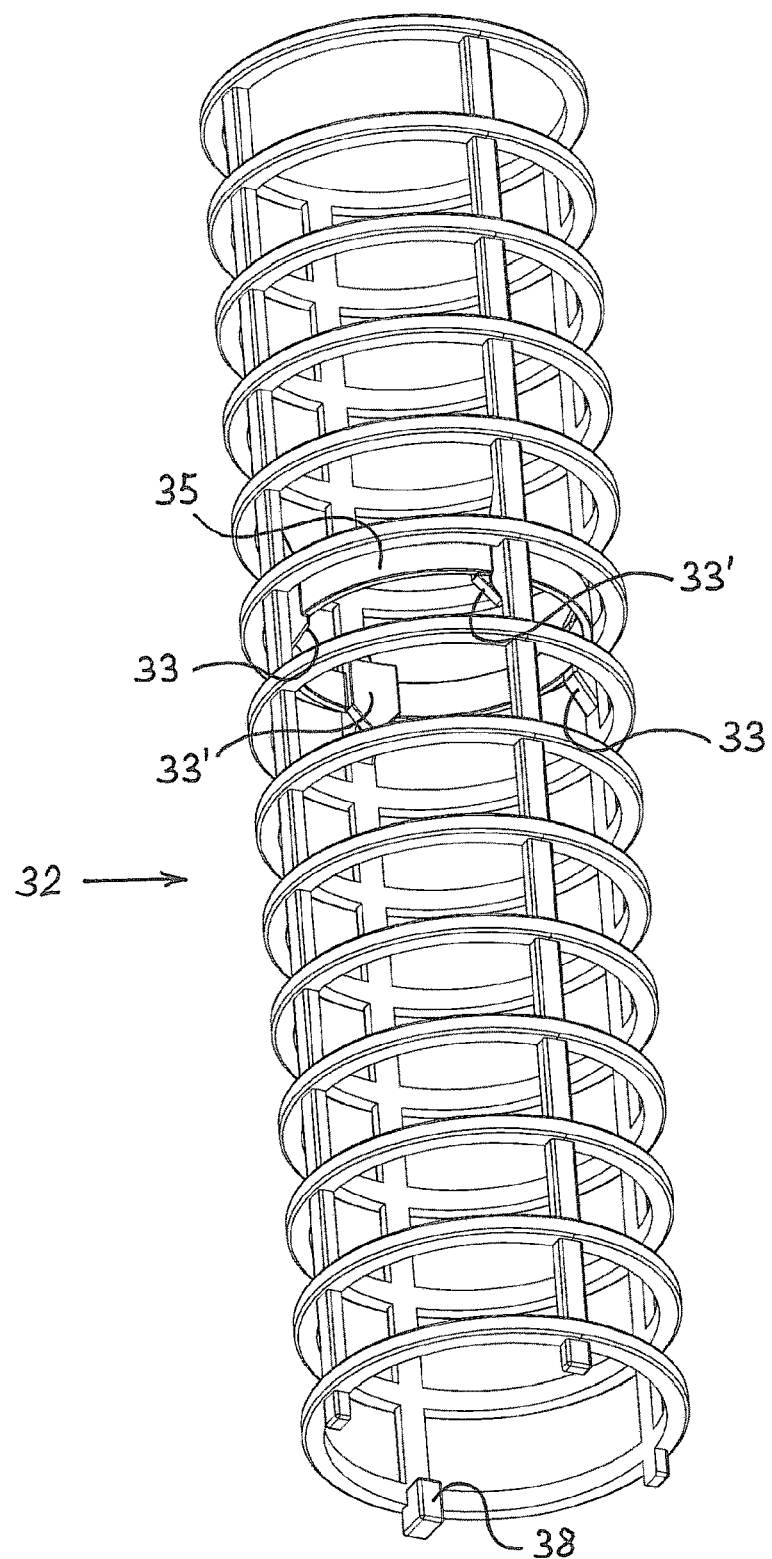
FIG. 18 shows a supporting body of a filter insert with integrated unlocking means, in an embodiment fitting the standpipe of FIG. 17, in a front view.

Positioning guide means 48 according to FIG. 17 are provided for interaction with an individual positioning guide means 38 on support body 32 shown in FIG. 18. Positioning guide means 38 has the shape of a radially inward-pointing cam, and is integrally formed on the lower end of support body 32, as is shown in FIG. 18. At approximately the halfway point along the height of support body 32 there is situated the above-described ring 35 with unlocking means 33, and guide means 33' used for the positioning thereof.

Figure 19:
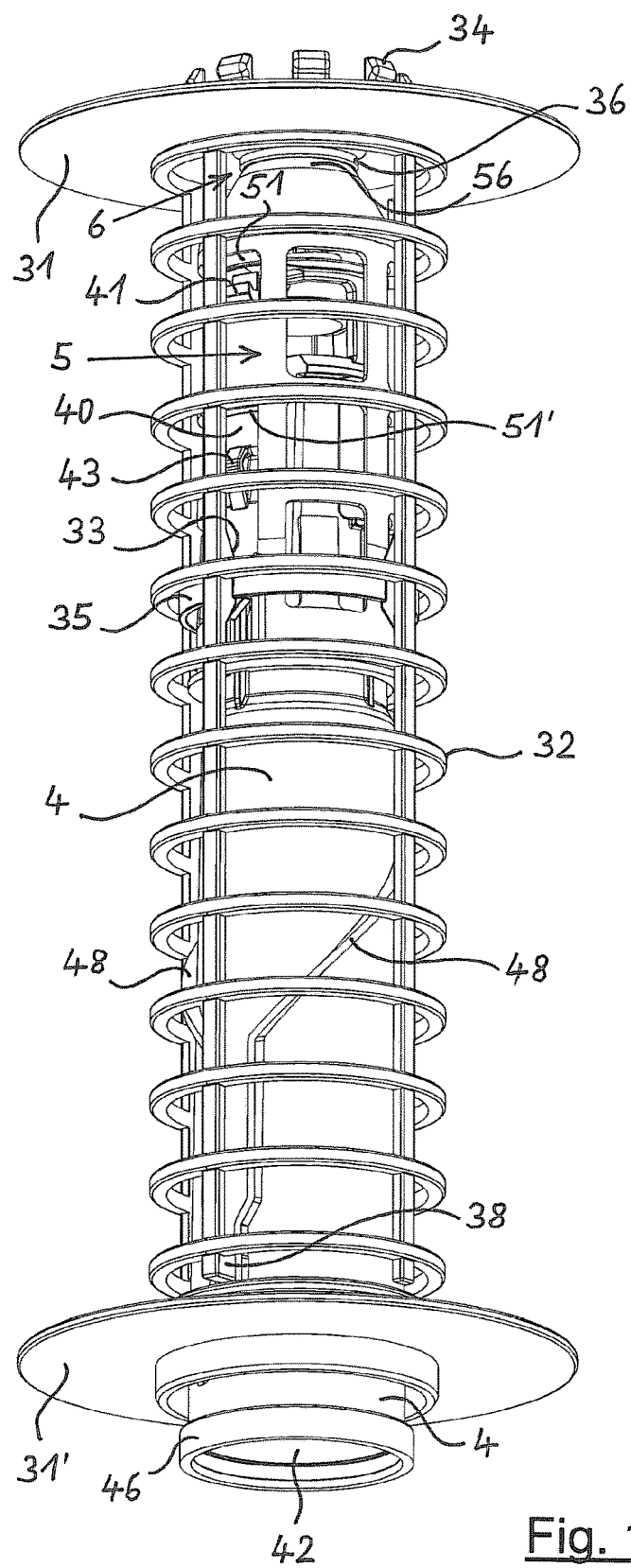
FIG. 19 shows the standpipe of FIG. 17 with attached displaceable end piece and with a filter insert placed thereon (shown without filter material body), in a front view.

FIG. 19 shows standpipe 4 of FIG. 17 and support body 32 (without filter material body), connected to two end plates 31 and 31', of filter insert 3, in the assembled state. During the installation of filter insert 3, this insert is placed onto standpipe 4 from above, and positioning guide means 38 on the lower end of support body 32 are force-guided into the position shown in FIG. 19 by positioning guide means 48 on the outer circumference of standpipe 4. In this position, unlocking means 33 on the inner circumference of support body 32 move into the engagement-ready position for the unlocking of locking tabs 40 on standpipe 4, by means of actuation via dogs 43.

At the top, on standpipe 4 there is seated end piece 5, having in its circumference openings 51 and 51' for interaction with locking cams 41 of locking tabs 40. The upper end of end piece 5 is here again realized as valve body 56 that works together with valve seat 36 in upper end plate 31 so as to form a filter circumvention valve 6. On the upper side of upper end plate 41, some of the locking tabs 34 integrally formed thereon are still visible. At bottom in FIG. 19, the lower end 46 of standpipe 4 is visible, through which fluid outlet channel 42 runs.

Figure 20:
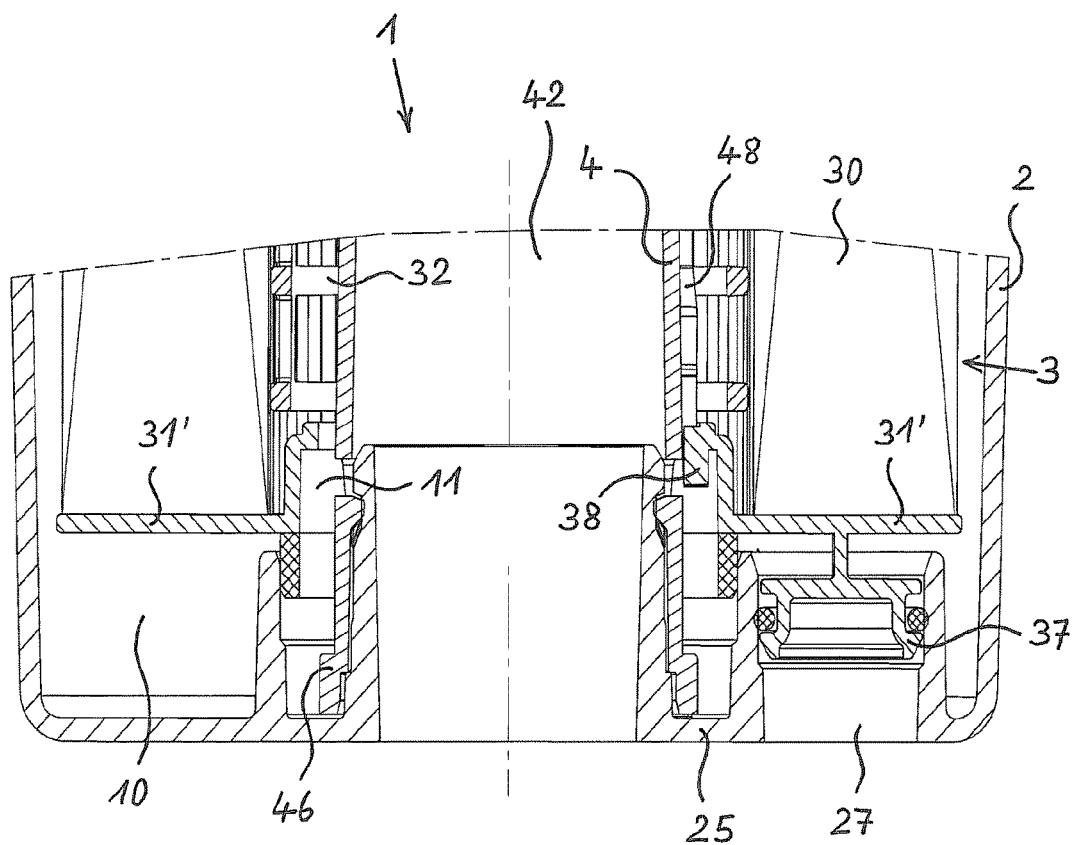
FIG. 20 shows a fluid filter in a third embodiment, having an eccentric drain channel in its housing base, and having a fitting filter insert placed therein having a closing mandrel, shown in partial longitudinal section through the lower filter part.

FIG. 20 shows an example of a fluid filter 1 in which, in addition to fluid outlet channel 42 for the cleaned fluid, there is provided a drain channel 27 in the base 25 of filter housing 2. Drain channel 27 allows the fluid in filter housing 2 to run out when filter insert 3 is removed from filter housing 2, so that filter insert 3 can be removed in a state as empty of fluid as possible. Drain channel 27 is situated eccentrically relative to fluid outlet channel 42; a closing mandrel 37 is used to seal drain channel 27 during normal operation of fluid filter 1, said mandrel being attached or integrally formed in a fitting eccentric position on lower end plate 31' of filter insert 3. Positioning guide means 48, situated on the outer circumference of standpipe 4 according to FIG. 17, are provided so that closing mandrel 37 will reliably move into engagement with drain channel 27 that is to be sealed when filter insert 3 is placed into filter housing 2. In interaction with individual positioning guide means 38 on the inner circumference of filter insert 3, filter insert 3 is force-guided in the circumferential direction relative to standpipe 4 and thus also relative to filter housing 2, into the engagement position of closing mandrel 37 relative to drain channel 27.

In the normal operating state according to FIG. 20, filter insert 3 separates raw side 10 from clean site 11 of fluid filter 1, and filtered, clean fluid flows through fluid outlet channel 42, while drain channel 27 is now sealed in fluid-tight fashion by closing mandrel 37. When, during a filter maintenance, filter insert 3 is moved upward in order to remove it from filter housing 2, closing mandrel 37 is removed from drain channel 27 already after a short movement path has been traveled, thus opening drain channel 27 and allowing the fluid in filter housing 2 to flow out. When filter insert 3 is finally removed from filter housing 2, it is practically free of fluid.

As an alternative to a screw connection, here standpipe 4 is connected at its lower end 46 to the base 25 of filter housing 2 by a locking connection. The upper part of standpipe 4, with movable and lockable/unlockable end piece 5, is realized in a manner corresponding to the examples already described.

Figure 21:
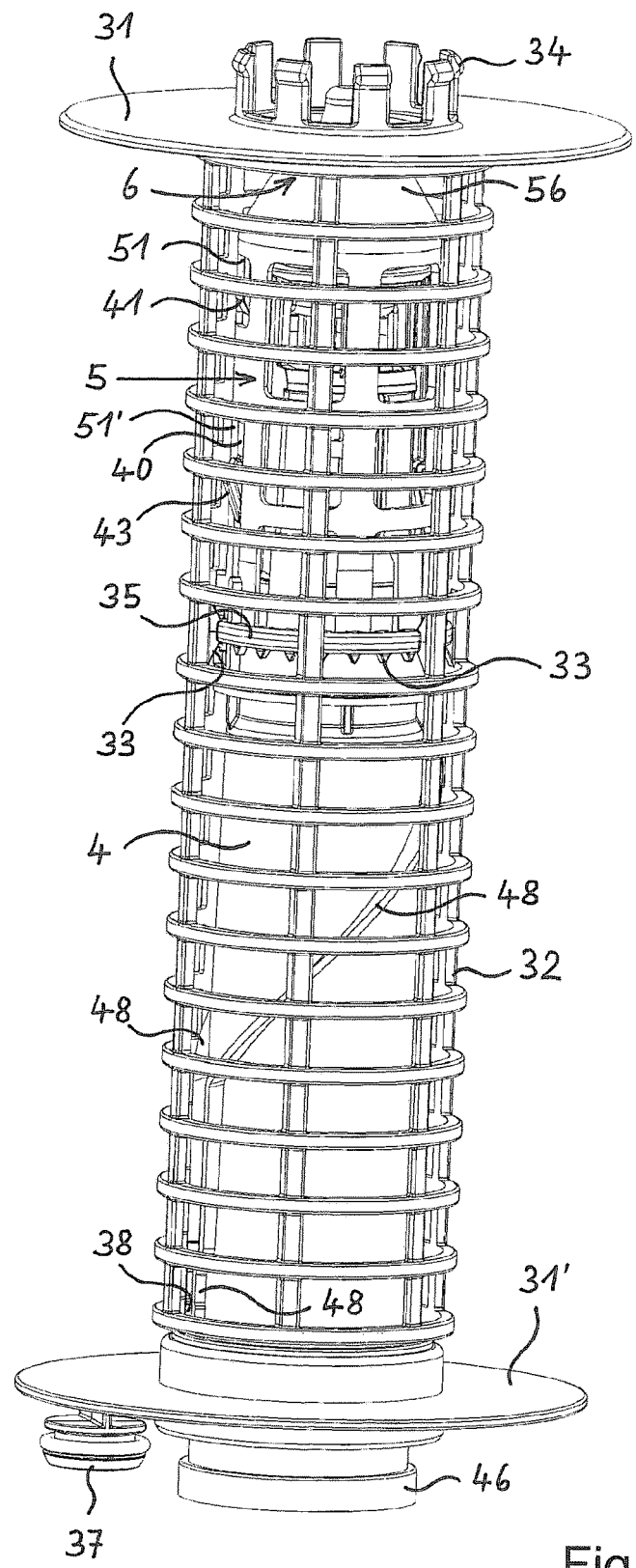
FIG. 21 shows the standpipe of the fluid filter of FIG. 20 with attached displaceable end piece and with a fitting filter insert placed thereon (shown without filter material body), in a front view.

FIG. 21 shows a standpipe 4 with end piece 5 and filter element placed thereon, shown here without filter material body for simplicity, i.e. only in the form of the two end plates 31 and 31' and support body 32. At the lower left, situated radially inwardly on support body 32 positioning guide means 38 thereof can be seen, which work together with positioning guide means 48 on the outer circumference of standpipe 4, providing a particular rotational position of filter insert 3 relative to standpipe 4 and relative to filter housing 2 (not shown here) in order to position eccentric closing mandrel 37 on the lower side of lower end plate 31' correctly, i.e. so as to mate with drain channel 37.

Figure 13:
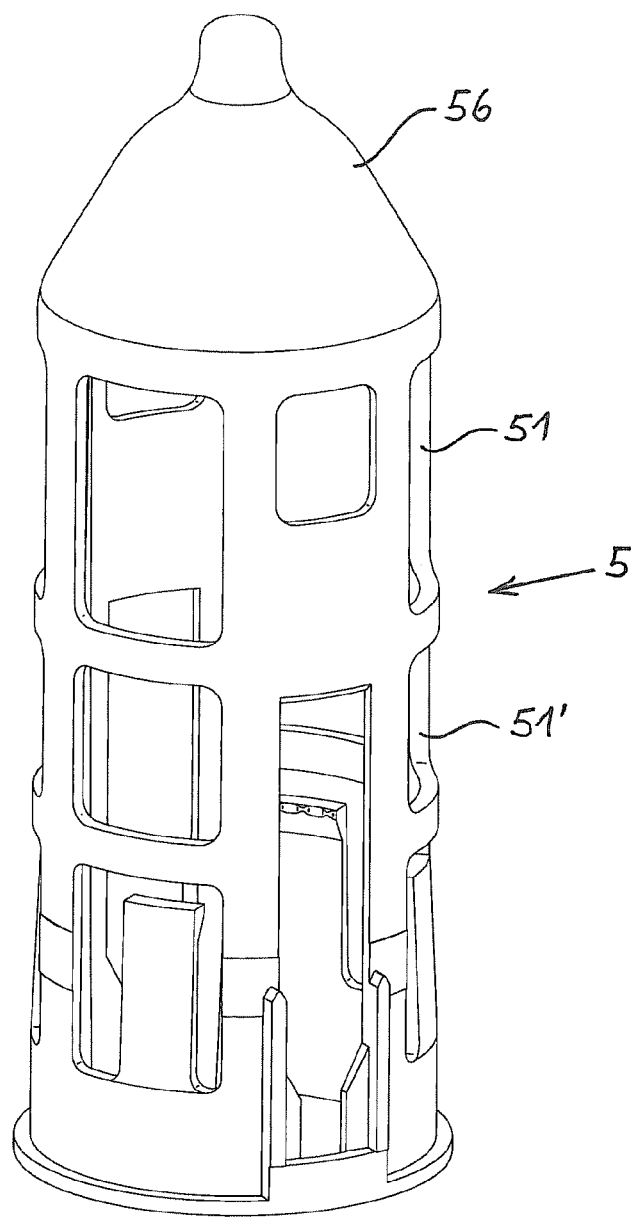
FIG. 13 shows an end piece that can be displaceably connected to the standpipe of FIG. 12, as an individual part, in a front view.

At the upper end of standpipe 4, end piece 5 is again guided so as to be axially displaceable. End piece 5 with its openings 51 and 51' and its valve body 56 here corresponds to the example shown in FIG. 13, and support body 33, with its ring 35 and unlocking means 33, here corresponds to the example shown in FIG. 14; reference is made to the descriptions thereof.

At the top on standpipe 4, one of locking tabs 40 inside end piece 5 is partly visible, in particular its upper-side end having locking cam 41, as well as its outward-protruding dog 43 for actuation in the unlocking direction by unlocking means 33.

Upper end plate 31 has in its center, again, valve seat 36 (not visible here), for the formation of filter circumvention valve 6, and has on its upper side the ring of locking tabs 34 for interaction with an associated filter housing cover.

Figure 22:
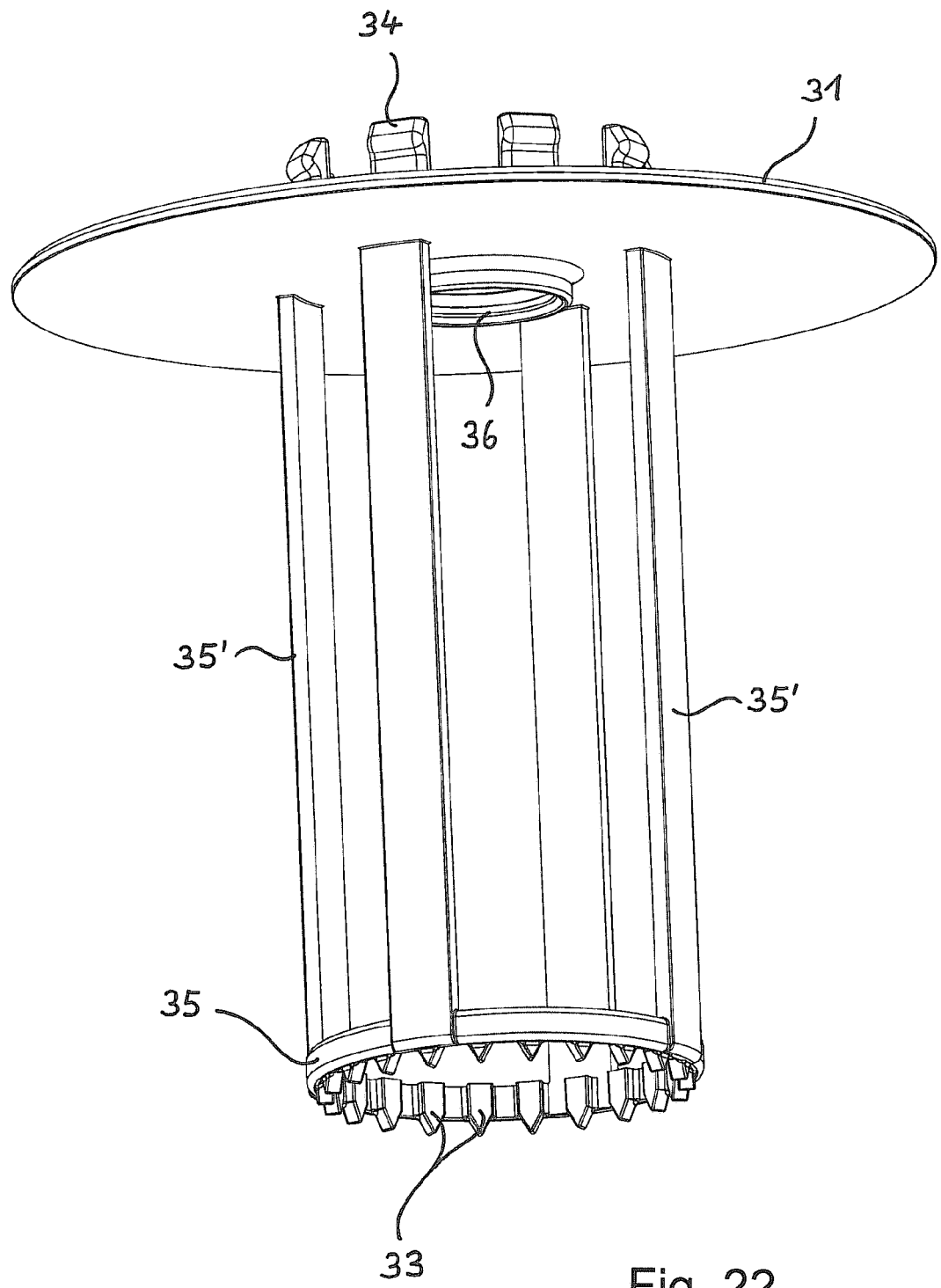
FIG. 22 shows the upper end plate of a filter insert with an unlocking means ring realized in one piece therewith, in a front view.

FIG. 22 shows the upper end plate 31 of a filter insert 3, with unlocking means ring 35 realized in one piece therewith, in a front view. From the underside of end plate 31, connecting struts 35' go out that run parallel to one another in the axial direction and that connect ring 35, which has unlocking means 33 on its inner circumference, in one piece with end plate 31. In this way, unlocking means 33 are held at the axial distance from upper end plate 31 of filter insert 3 that is required for their functioning On the upper side of end plate 31, a part of upper-side locking tabs 34 is still visible. Valve seat 36 is situated in the center of end plate 31. Due to the one-piece construction of the component shown in FIG. 22, its production as a mass part is economically possible, in particular as an injection-molded part made of plastic.

Figure 23:
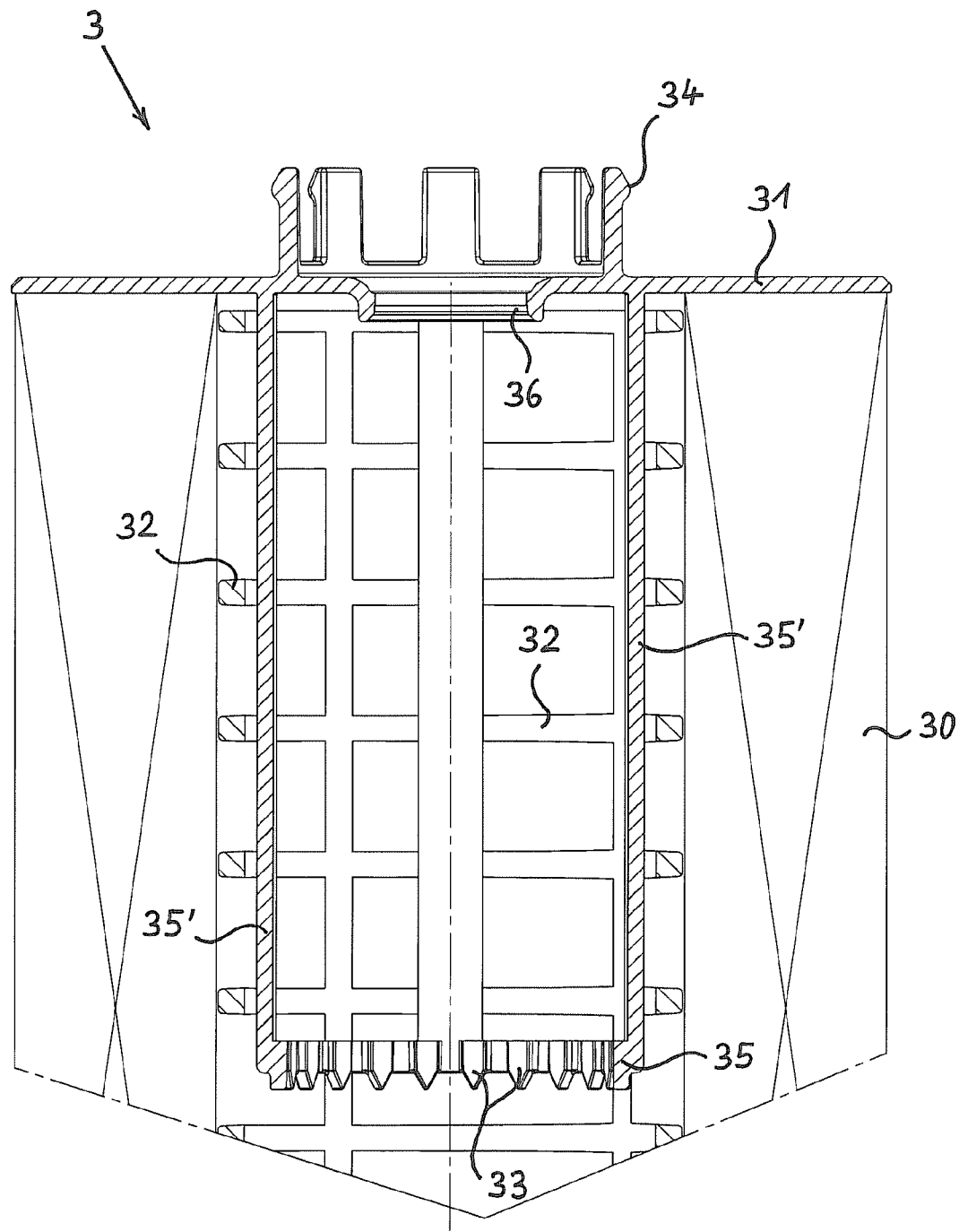
FIG. 23 shows a filter insert with the end plate of FIG. 22, in partial longitudinal section.

FIG. 23 shows a filter insert 3 having end plate 31 from FIG. 22, in partial longitudinal section. Here, filter insert 3 again has hollow cylindrical filter material body 30 in whose interior there is situated supporting body 32, which radially inwardly supports filter material body 30 against collapse during operation. Immediately radially inward from support body 32, there run connecting struts 35', which extend downward going out from the underside of upper end plate 31. On the lower end of connecting struts 35', ring 35 is integrally formed in one piece, and has unlocking means 33 on its inner circumference. In this embodiment, therefore, unlocking means 33 form a part of upper end plate 31 of filter insert 3.

Figure 24:
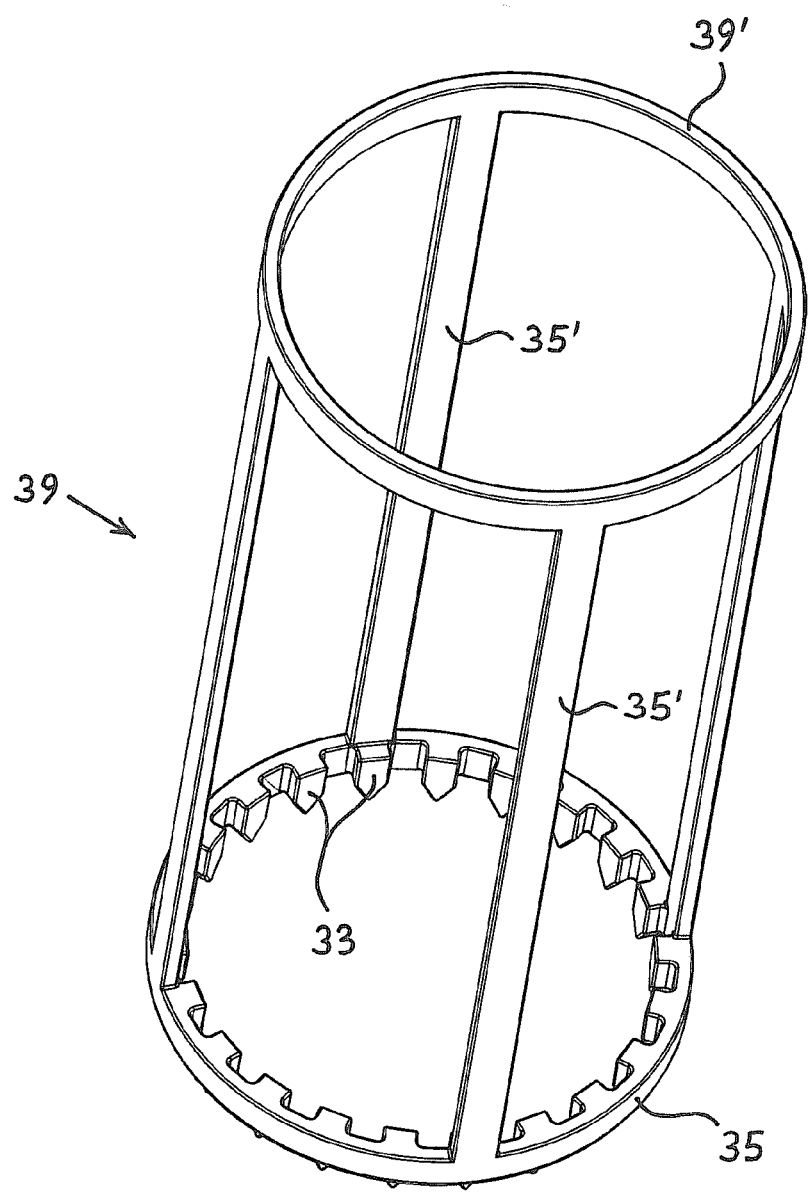
FIG. 24 shows an unlocking means body forming a separate component, in a front view.

FIG. 24 shows, as an alternative, a front view of an unlocking means body 39 forming a separate component. Unlocking means body 39 is made up of two rings 35 and 39', situated at a distance from one another axially, connected to one another in one piece via, here, a total of four axial connecting struts 35. Upper ring 39' forms a support ring. Lower ring 35 bears unlocking means 33 on its inner circumference.

Figure 25:
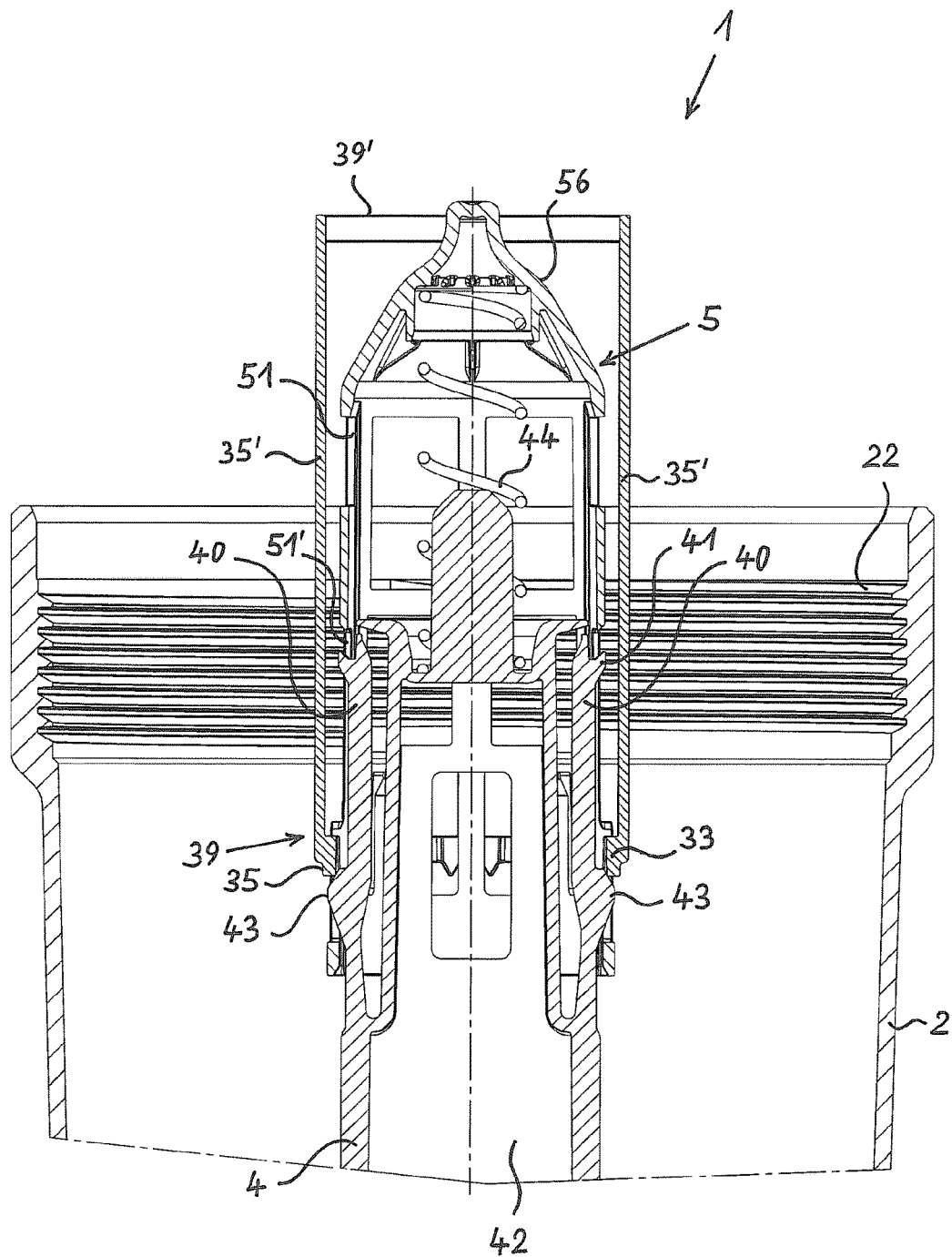
FIG. 25 shows the unlocking means body of FIG. 24 during its placement into a filter housing, in longitudinal section.

FIG. 25 shows unlocking means body 39 from FIG. 24 during its placement into a filter housing 2, in a longitudinal section. Fluid filter 1 is radially outwardly limited by filter housing 2; here it is shown with cover 21 removed, i.e. open at the top. On the inner circumference of the upper end of filter housing 2, screw threading 22 thereof for the cover is situated. In the center of housing 2, standpipe 4 is again situated, with end piece 5 guided so as to be axially displaceable thereon; standpipe 4 and end piece 5 correspond to the embodiments described above, and reference is hereby made to the description thereof. Because the cover of filter housing 2 in FIG. 25 has been removed, and no filter insert has been installed, spring 44 is able to bring end piece 5 into its expelled position. In this state of end piece 5, locking tabs 40 are situated, with their respective locking cams 41, in lower openings 51' in locking fashion, thus preventing a downward pushing in of end piece 5.

In addition, FIG. 25 shows unlocking means body 39 from FIG. 24, now in its state in which it is placed from above onto end piece 5 and standpipe 4. After this placement, ring 35, which forms the lower end of unlocking means body 39, is situated with unlocking means 33 immediately above dogs 43 of locking tabs 40. Support ring 39', forming the upper end of unlocking means body 39, is now situated at the height of the upper end of end piece 5. As long as no force acting downward in the axial direction is exerted on unlocking means body 39, this body remains in the position shown in FIG. 25.

Figure 26:
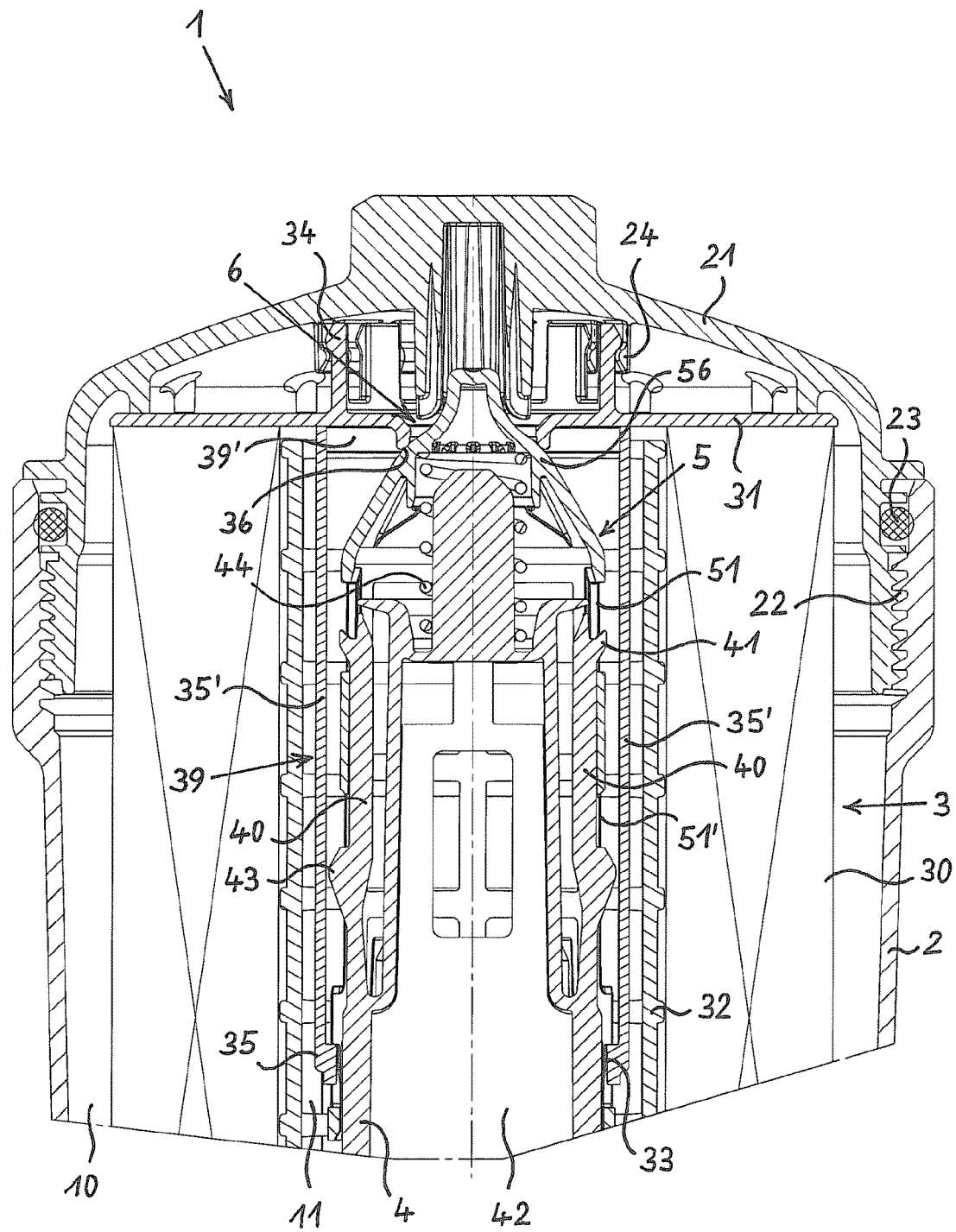
FIG. 26 shows a fluid filter with the unlocking means body of FIG. 24 in the installed state, in partial longitudinal section.

If, as shown in FIG. 26, a filter insert 3 is now placed from above onto standpipe 4 with end piece 5 and unlocking means body 39, and is pressed downward in the axial direction, upper end plate 31 of filter insert 3 presses unlocking means body 39 downward, via support ring 39' adjoining the underside of said end plate. This causes unlocking means 33 of unlocking means body 39 to move into unlocking engagement with dogs 43 of locking tabs 40, and to temporarily move these tabs into their unlocking position. While locking tabs 40 are in their unlocking position, end piece 5 can, now together with unlocking means body 39, be moved downward until the state shown in FIG. 26, which is the installed state, is reached.

The movement of filter insert 3 downward, and the movement caused thereby of unlocking means body 39 and of end piece 5, also downward, are usefully caused by the screwing on of cover 21. For this purpose, cover 21 has on its lower side the already-mentioned locking tabs 24 that can be brought into a locking connection with locking tabs 34 on the upper side of upper end plate 31, as is shown in FIG. 26.

With regard to the further individual parts and functions, the example shown in FIG. 26 corresponds to the embodiments previously described.

Figure 27:
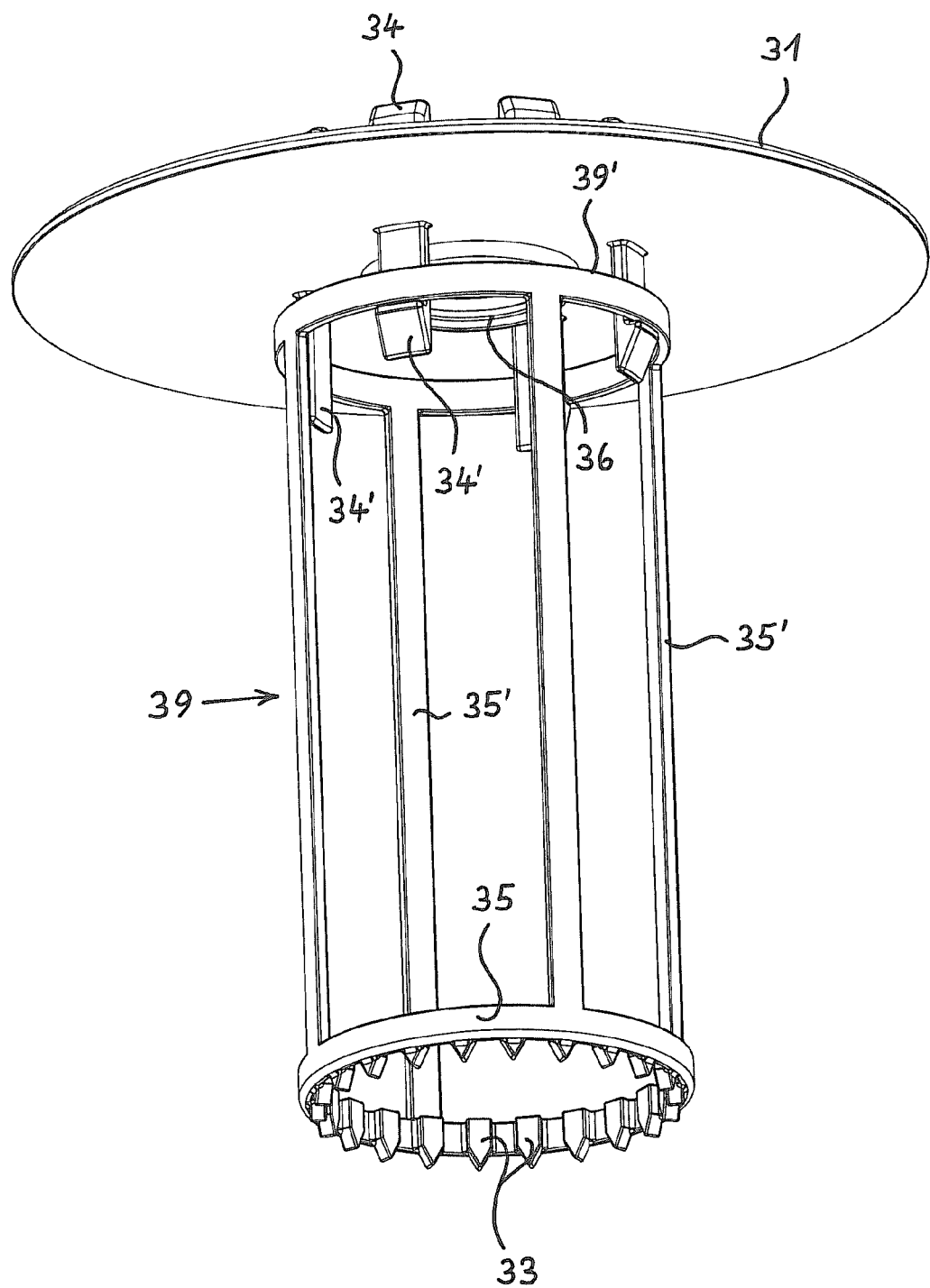
FIG. 27 shows the unlocking means body of FIG. 24 in a state in which it is locked with the upper end plate of a filter insert, in a front view.

FIG. 27 shows unlocking means body 39 from FIG. 24 in a state in which it is locked with upper end plate 31 of a filter insert 3, in a front view. At the top in FIG. 27, upper end plate 31 of filter insert 3 (not otherwise shown) is visible. A small portion of locking tabs 34 can still be seen on the upper side of end plate 31. Underneath end plate 31, concentrically thereto, unlocking means body 39 is visible, which has a perforated hollow cylindrical basic shape and is formed by the already-described rings 35 and 39' and connecting struts 35' that connect them.

From the underside of upper end plate 31, locking tabs 34', situated on a circular line, extend downward, and here stand in locking engagement with support ring 39' of unlocking means body 39. In order to produce this locking connection, an axial movement of end plate 31 and unlocking means body 39 towards one another is sufficient, which takes place automatically when filter insert 3 is installed after previously placing unlocking means body 39 onto standpipe 4. In this way, unlocking means body 39 is carried along when a used filter insert 3 is removed from filter housing 2, and a separate removal of unlocking means body 39 is not required. Unlocking means body 39 can also be manually locked with filter insert 3 already before the placing of filter insert 3 into filter housing 2, after which a unit made up of filter insert 3 and unlocking means body 39 can then be placed as a whole onto standpipe 4 and installed in filter housing 2.

Figure 28:
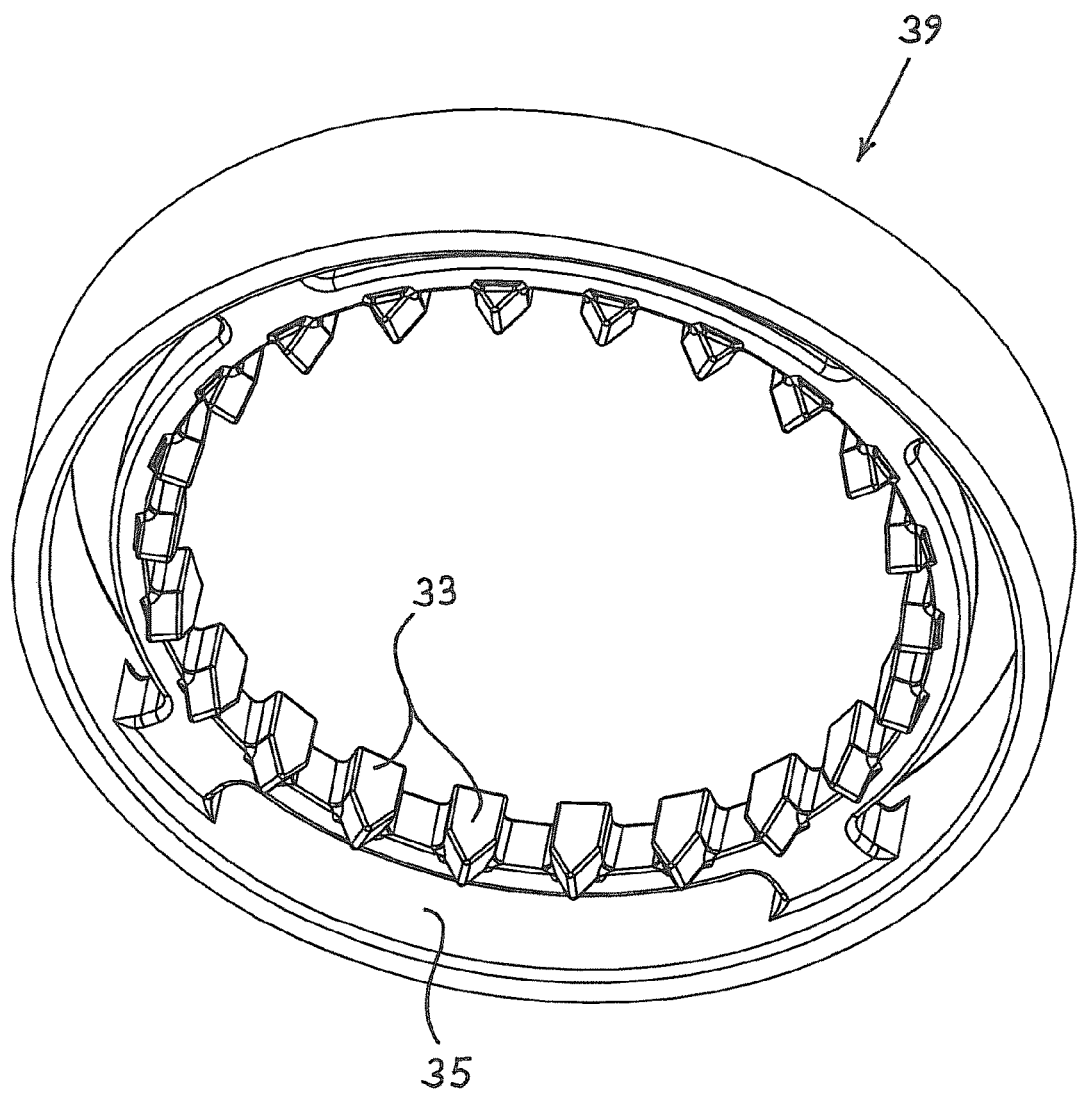
FIG. 28 shows an unlocking means body forming a separate component in a second embodiment, in a front view.

FIG. 28 shows an unlocking means body 39, forming a separate component, in a second embodiment in a front view. This embodiment of unlocking means body 39 is distinguished by a very compact construction in the axial direction, because it has a very small constructive height. Seen in the radial direction, unlocking means body 39 is here made up of a double ring 35 whose parts are connected to one another in one piece by spoke-type connecting elements in order to leave open a fluid passage between the parts of double ring 35. The inner part of double ring 35 bears, on its inner circumference, the already-described unlocking means 33. The outer part of double ring 35 has a cylindrical outer circumferential surface.

Figure 29:
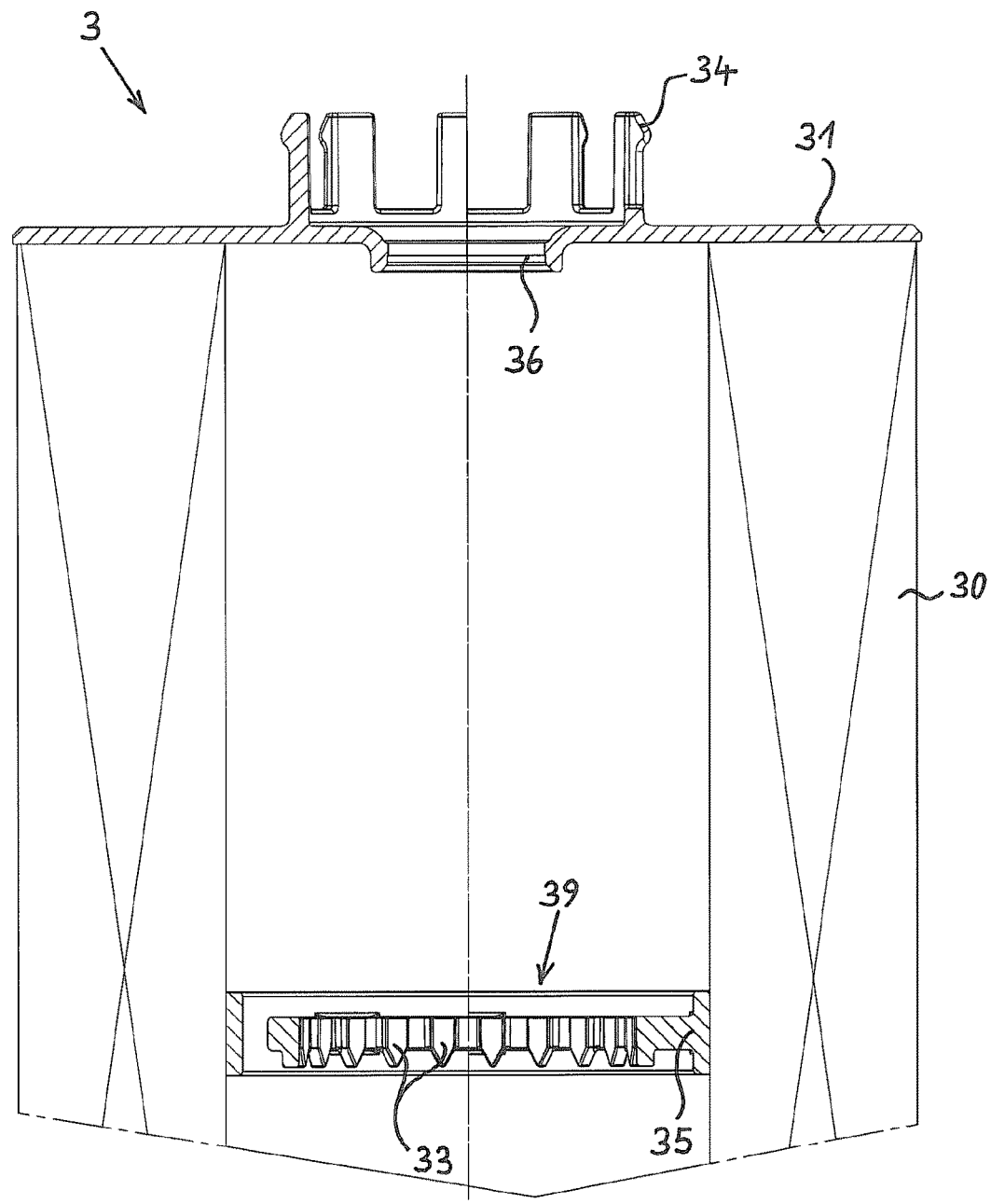
FIG. 29 shows the unlocking means body of FIG. 28 in a state in which it is connected to the filter material body of a filter insert, in longitudinal section.

FIG. 29 shows the unlocking means body from FIG. 28 in a state in which it is connected to filter material body 30 of a filter insert 3, in longitudinal section. At the top in FIG. 29, upper end plate 31 of filter insert 3 can be seen, with its upper-side locking tabs 34 and its central valve seat 36. On its lower side, end plate 31 is connected to hollow cylindrical filter material body 30, for example by gluing or welding. At a suitable axial distance from upper end plate 31, unlocking means body 39 shown in FIG. 28 is connected to the inner circumference of filter material body 30, usefully by gluing or welding along its cylindrical outer circumferential surface. Thus, in this example unlocking means body 39 is first produced as a separate component and is then connected to filter insert 3 in the axial position appropriate for its function.

When filter insert 3 according to FIG. 29 is installed in a filter housing 2 of the type described above, unlocking means 33 on the inner circumference of unlocking means body 39 installed in filter material body 30 actuate the locking tabs in the unlocking direction, thus enabling the further introduction of filter insert 3 into filter housing 2 and, together therewith, the insertion of end piece 5.

Figure 30:
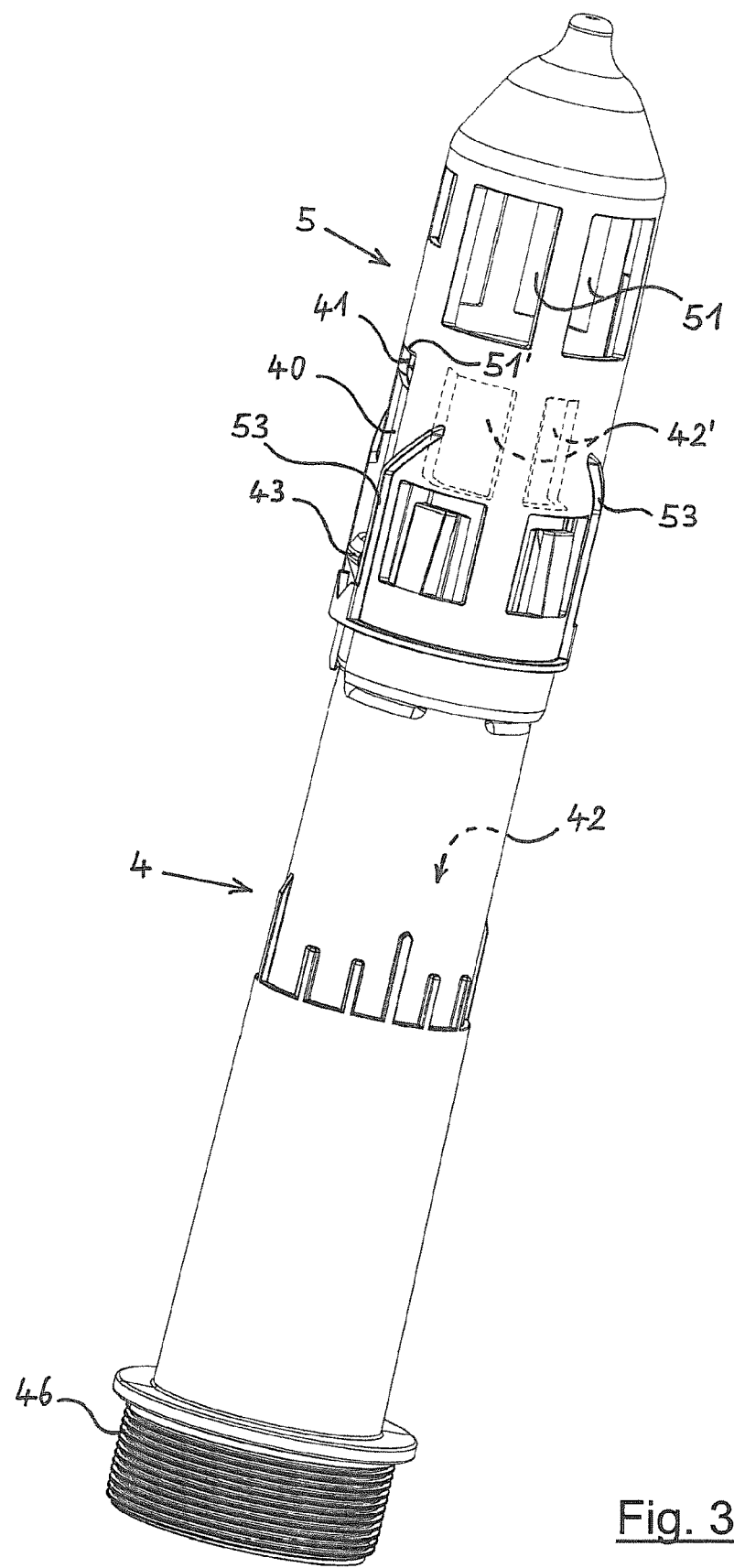
FIG. 30 shows the standpipe in a further embodiment with pushed-out displaceable end piece, in a front view.
Figure 31:
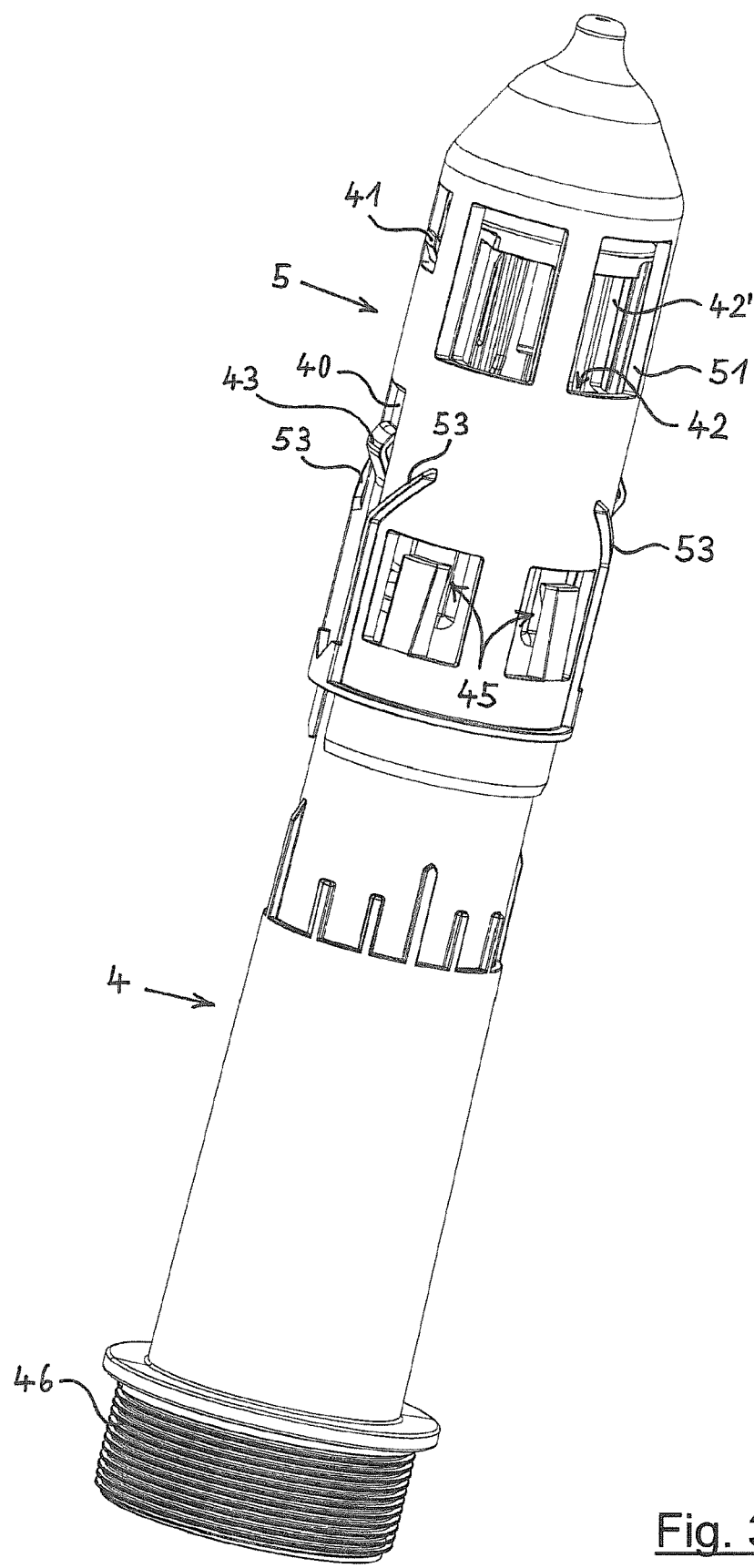
FIG. 31 shows the standpipe of FIG. 30 with pushed-in displaceable end piece, in a front view.

Finally, FIGS. 30 and 31 show standpipe 4 in a further embodiment, in each case with movable end piece 5, in a front view. Here, standpipe 4 has, in its region guiding end piece 5, a plurality of openings 42' distributed around the circumference; the standpipe is closed at its upper end. In its region guided on standpipe 4, end piece 5 has a plurality of openings 51 distributed around the circumference.

When end piece 5 is pushed out, as is shown in FIG. 30, openings 42' and 51 move out of coincidence in order to outwardly close fluid outlet channel 42 in standpipe 4. In this way, the entry of dirt particles into fluid outlet channel 42 when filter insert 3 is removed from standpipe 4 is reliably prevented.

When filter insert 3 (not shown here) is placed onto standpipe 4, and filter housing 2 is sealed, end piece 5 is then unlocked and pushed in, as is shown in FIG. 31. In this pushed-in position of end piece 5, openings 42' and 51 coincide, in order to form together an overflow opening from the interior of filter insert 3 into fluid outlet channel 42 in standpipe 4. In this way, during operation of filter 1 the overflow of fluid from the interior of filter insert 3 into fluid outlet channel 42 is enabled.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS 1 fluid filter
10 raw side
11 clean side
2 filter housing
21 cover 22 screw threading
23 seal
24 locking tabs on 21
25 base of 2
27 drain channel
3 filter insert
3' foreign filter insert
30 filter material body
31 upper end plate
31' lower end plate
32 support body
33 unlocking means (ribs)
33' guide means
34 locking tabs at top on 31
34' locking tabs at bottom on 31
35 ring
35' connecting struts
36 valve seat in 31
37 closing mandrel for 27
38 positioning guide means on 3
39 unlocking means body
39' support ring
4 standpipe
40 locking tabs
40' locking tab stop
41 locking dogs
41' locking surface
42 fluid outlet channel in 4
42' opening
43 dogs
44 spring
44' spring support
45 rail guide for 5
46 lower end
48 positioning guide means on 4
5 end piece
51 upper openings for 41
51' lower openings for 41
53 positioning guide means on 5
56 valve body
6 filter circumvention valve

The invention claimed is:

1. A replaceable filter insert for use in a fluid filter having a filter housing and a cover, the filter housing having a central standpipe connected thereto arranged to receive the filter insert thereon, the standpipe having on a free side facing the cover an end piece that is axially displaceable relative to the standpipe, the end piece being preloaded by a force acting in an upward direction of expulsion, the end piece, when in its expelled position, being locked by a locking device that prevents it from being pushed further down the standpipe after a limited extent, and a connection of the cover to the filter housing then being prevented, the locking device being formed by locking tabs that form a part of the standpipe or the end piece, the locking tabs being preloaded by a force acting in the radial outward locking direction, and each locking tab, with its respective locking surface, preventing the end piece in its upward expelled position from being axially pushed down relative to the standpipe, wherein the locking tabs are capable of being moved in the radial inward direction into their unlocking position, and wherein, in order to form a filter circumvention valve, an end face of the end piece is fashioned as a valve body, the filter insert comprising:

a hollow cylindrical filter material body,
two end plates enclosing said filter material body at its ends,
at least one protruding member movable with the filter insert, wherein the at least one protruding member comprises a plurality of ribs protruding radially inward in the unlocking direction of the locking tabs,
a cover-side one of the end plates of the filter insert having a central opening that forms a valve seat for the valve body in order to form a filter circumvention valve, and
the filter insert being configured to be placed onto the central standpipe connected to the filter housing, and
the protruding member on the filter insert, when the filter insert is placed onto the standpipe, configured to actuate the locking device in the radial inward unlocking direction and allowing a complete placing of the filter insert,
wherein when the filter insert is placed onto the standpipe, the protruding member is brought into engagement with the locking device, wherein the locking tabs are moved radially inward in the unlocking direction by the protruding member, enabling a pushing down of the end piece on the standpipe,
wherein at least one of the protruding member and an additional guide element situated on the filter insert, is configured to interact with positioning guide elements situated on an outer circumference of the end piece or the standpipe, such that when the filter insert is placed onto the standpipe, the protruding member is force-guided in the circumferential direction, into a position suitable for engagement with the locking tab, and
wherein the at least one protruding member directly engages the locking tabs and urges the locking tabs inwardly.

2. The filter insert as recited in claim 1, further comprising a hollow cylindrical perforated supporting body supporting the filter material body, wherein the protruding member is situated on, or integrally formed on, the supporting body situated in the interior of the filter material body between the end plates.

3. The filter insert as recited in claim 1, wherein the protruding member is situated on or integrally formed on, a ring that is connected to or made in one piece with, the filter material body of the filter insert or one of the end plates.

4. The filter insert as recited in claim 1, wherein a protruding member body is situated in the filter insert, and wherein the protruding member body has the basic shape of a perforated hollow cylinder, the protruding member being situated on a lower annular end of the protruding element body, and an upper end of the protruding member body forming a support ring that, in the installed state, lies against the underside of the one end plate of the filter insert.

5. The filter insert as recited in claim 4, wherein the end plate and the protruding member body have interacting locking connection arrangements that can be brought into engagement by an axial movement relative to one another.

6. The filter insert as recited in claim 1, wherein the filter insert has, on the side facing away from the filter material body of its one end plate, an axially protruding eccentric closing mandrel for a drain channel situated eccentrically in the base of an associated filter housing, and wherein on the inner circumference of the filter insert there are situated positioning guide elements for interaction with positioning guide elements provided on the outer circumference of a standpipe of the associated filter housing, the positioning guide elements being situated such that when the filter insert is placed onto the standpipe the filter insert can be force-guided in the circumferential direction into a position of the closing mandrel suitable for engagement with the drain channel.

7. The fluid filter as recited in claim 1, wherein the protruding member is situated on a separate protruding member body that can be placed onto the standpipe either before the filter insert or with the filter insert.

8. A fluid filter insert for a fluid filter having a filter housing, a cover and a central standpipe with a locking device preventing a closing of the cover, the filter insert comprising:
- a hollow cylindrical filter material body,
- two end plates enclosing said filter material body at its ends, and
- at least one protruding member movable with the filter insert,
- wherein the filter insert is configured to be placed onto the standpipe, and the protruding member of the filter insert, when the filter insert is placed onto the standpipe, is configured to actuate the locking device in a radial inward unlocking direction and allowing a complete placing of the filter insert,
- wherein when the filter insert is placed onto the standpipe, the protruding member is brought into engagement with the locking device, wherein the locking device is moved in the radial inward unlocking direction by the protruding member, and,
- wherein the at least one protruding member directly engages the locking device and urges the locking device inwardly.

9. The filter insert as recited in claim 8, wherein, at least one of the protruding member and an additional guide element situated on the filter insert, is configured to interact with positioning guide elements situated on an outer circumference of the standpipe, such that when the filter insert is placed onto the standpipe, the protruding member is force-guided in the circumferential direction, into a position suitable for engagement with the locking device.

10. The filter insert as recited in claim 8, wherein the protruding member comprises a plurality of ribs protruding radially inward in the unlocking direction of the locking device.

11. The filter insert as recited in claim 8, further comprising a hollow cylindrical perforated supporting body supporting the filter material body, wherein the protruding member is situated on, or integrally formed on, the supporting body situated in the interior of the filter material body between the end plates.

12. The filter insert as recited in claim 8, wherein the protruding member is situated on, or integrally formed on, a ring that is connected to or made in one piece with, the filter material body of the filter insert or one of the end plates.

13. The filter insert as recited in claim 8, wherein a protruding member body is situated in the filter insert, and wherein the protruding member body has the basic shape of a perforated hollow cylinder, the protruding member being situated on a lower annular end of the protruding element body, and an upper end of the protruding member body forming a support ring that, in the installed state, lies against the underside of the one end plate of the filter insert.

14. The filter insert as recited in claim 13, wherein the end plate and the protruding member body have interacting locking connection arrangements that can be brought into engagement by an axial movement relative to one another.

15. The filter insert as recited in claim 8, wherein the filter insert has, on the side facing away from the filter material body of its one end plate, an axially protruding eccentric closing mandrel for a drain channel situated eccentrically in the base of an associated filter housing, and wherein on the inner circumference of the filter insert there are situated positioning guide elements for interaction with positioning guide elements provided on the outer circumference of a standpipe of the associated filter housing, the positioning guide elements being situated such that when the filter insert is placed onto the standpipe the filter insert can be force-guided in the circumferential direction into a position of the closing mandrel suitable for engagement with the drain channel.

16. The fluid filter as recited in claim 8, wherein the protruding member is situated on a separate protruding member body that can be placed onto the standpipe either before the filter insert or with the filter insert.

17. A fluid filter insert for a fluid filter having a filter housing, a cover and a central standpipe with a locking device preventing a closing of the cover, the filter insert comprising:
- a hollow cylindrical filter material body,
- two end plates enclosing said filter material body at its ends, and
- at least one radially inwardly protruding member movable with the filter insert,
- wherein the filter insert is configured to be placed onto the standpipe, and the protruding member, when the filter insert is placed onto the standpipe, is configured to actuate the locking device,
- wherein the at least one protruding member directly engages the locking device and urges the locking device inwardly.

* * * * *